(12) United States Patent
Jee et al.

(10) Patent No.: US 10,059,805 B2
(45) Date of Patent: Aug. 28, 2018

(54) COMPOSITION FOR PREPARING POLYIMIDE-INORGANIC PARTICLE COMPOSITE, ARTICLE PREPARED THEREFROM, AND OPTICAL DEVICE COMPRISING SAME

(71) Applicant: SAMSUNG ELECTRONICS CO., LTD., Suwon-si, Gyeonggi-do (KR)

(72) Inventors: Sang Soo Jee, Hwaseong-si (KR); Young Jae Kang, Yongin-si-si (KR); Hyun Jeong Jeon, Seoul (KR); Byung Hee Sohn, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 43 days.

(21) Appl. No.: 14/873,376

(22) Filed: Oct. 2, 2015

(65) Prior Publication Data

US 2016/0096927 A1  Apr. 7, 2016

(30) Foreign Application Priority Data

Oct. 2, 2014 (KR) ................... 10-2014-0133165

(51) Int. Cl.
| | |
|---|---|
| C08L 79/08 | (2006.01) |
| C08G 69/26 | (2006.01) |
| C08G 69/28 | (2006.01) |
| C08K 9/06 | (2006.01) |
| C08K 3/20 | (2006.01) |
| C08G 73/10 | (2006.01) |
| C09D 179/08 | (2006.01) |
| C09J 179/08 | (2006.01) |

(52) U.S. Cl.
CPC ....... *C08G 73/106* (2013.01); *C08G 73/1007* (2013.01); *C08K 9/06* (2013.01); *C08L 79/08* (2013.01); *C09D 179/08* (2013.01); *C09J 179/08* (2013.01); *C08G 73/1039* (2013.01); *C08G 73/1042* (2013.01)

(58) Field of Classification Search
CPC ........... C08L 79/08; C08G 73/10; C08K 3/22; C08K 9/06
USPC .............................. 524/430; 523/213; 528/339
See application file for complete search history.

(56) References Cited

U.S. PATENT DOCUMENTS

| | | | |
|---|---|---|---|
| 4,759,987 A * | 7/1988 | Mizobe | C08J 3/215 427/216 |
| 5,494,949 A | 2/1996 | Kinkel et al. | |
| 9,365,694 B2 | 6/2016 | Cho et al. | |
| 2009/0143521 A1 | 6/2009 | Li et al. | |
| 2009/0288699 A1 * | 11/2009 | Auman | B32B 15/08 136/249 |
| 2011/0091732 A1 | 4/2011 | Lu et al. | |
| 2011/0124806 A1 * | 5/2011 | Simmons | C08G 73/1042 524/600 |
| 2013/0037786 A1 | 2/2013 | Miyao et al. | |
| 2013/0126860 A1 * | 5/2013 | Fukuda | C08L 79/08 257/43 |
| 2013/0126940 A1 * | 5/2013 | Simone | C08G 73/1039 257/100 |
| 2014/0031499 A1 | 1/2014 | Cho et al. | |

FOREIGN PATENT DOCUMENTS

| | | |
|---|---|---|
| CN | 102850563 A | 1/2013 |
| CN | 103571190 A | 2/2014 |
| JP | 04-153261 A | 5/1992 |
| JP | 2007-063502 A | 3/2007 |
| JP | 5082814 B2 | 9/2012 |
| KR | 0366147 B1 | 12/2002 |
| KR | 20130018109 A | 2/2013 |

OTHER PUBLICATIONS

A brochure for Ti-Pure R-101 by Chemours, 3 pages, Copyrighted 2015, Downloaded on Apr. 27, 2017.*
Extended European Search Report dated Feb. 11, 2016 for the corresponding European Patent Application No. 15187878.2.
E.L. Frankevich et al. "Photoconductivity of the Charge Transfer Complex Crystals Anthracene-Dimethylpyromellitimide", Phys. Stat. col. (a) 40, 655-662 (1977).
Horst Hintze-Bruening et al. "Nanocomposite Based Multifuctional Coatings" in New Advances in Vehicular Technology and Automotive Engineering, edited by Joao Paulo Carmo (2012) Chapter 2, pp. 55-90.
Office Action dated Apr. 13, 2018, issued for the corresponding Chinese Patent Application No. 201510647194.9, with English Translation.

* cited by examiner

*Primary Examiner* — Tae H Yoon
(74) *Attorney, Agent, or Firm* — Cantor Colburn LLP

(57) ABSTRACT

A composition for preparing a polyimide-inorganic particle composite, including a tetracarboxylic acid dianhydride represented by Chemical Formula 1, a diamine represented by Chemical Formula 2, and an inorganic particle having an amino group on its surface:

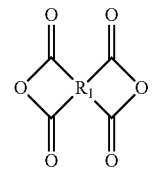

wherein the definitions of groups $R_1$ and $R_2$ in Chemical Formula 1 and Chemical Formula 2 are the same as described in the detailed description.

19 Claims, 16 Drawing Sheets

COMPOSITION FOR PREPARING POLYIMIDE-INORGANIC PARTICLE COMPOSITE, ARTICLE PREPARED THEREFROM, AND OPTICAL DEVICE COMPRISING SAME

CROSS-REFERENCE TO RELATED APPLICATION

This application claims priority to Korean Patent Application No. 10-2014-0133165, filed on Oct. 2, 2014, and all the benefits accruing therefrom under 35 U.S.C. § 119, the content of which is incorporated herein in its entirety by reference.

BACKGROUND

1. Field

This disclosure relates to a composition for preparing polyimide-inorganic particle composite, an article prepared therefrom, and an optical device including the same.

2. Description of the Related Art

A colorless transparent material has been an object of research for diverse applications such as an optical lens, a functional optical film, and a disk substrate. But as information devices are further miniaturized and display devices providing higher resolution are developed, better functional features and greater performance are desired for the material.

Therefore, there remains a need in a colorless transparent material having excellent transparency, heat resistance, mechanical strength, and flexibility to ensure high resolution.

SUMMARY

An embodiment provides a composition for preparing a polyimide-inorganic particle composite maintaining high transmittance after being treated at a high temperature.

Another embodiment provides an article prepared from the composition for preparing a polyimide-inorganic particle composite.

Another embodiment provides an optical device including the article.

According to an embodiment, provided is a composition for preparing a polyimide-inorganic particle composite, including:

a tetracarboxylic acid dianhydride represented by Chemical Formula 1, a diamine represented by Chemical Formula 2, and an inorganic particle including an amino group on its surface:

Chemical Formula 1

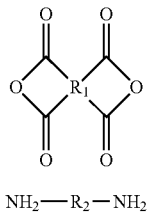

Chemical Formula 2

$NH_2-R_2-NH_2$ wherein, in Chemical Formula 1 and Chemical Formula 2, $R^1$ and $R^2$ are the same or different, and are each independently a substituted or unsubstituted C4 to C30 alicyclic organic group, or a substituted or unsubstituted C6 to C30 aromatic organic group, wherein the alicyclic or aromatic organic group includes one ring, two or more rings fused together to provide a condensed ring system, or two or more rings linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(C$_n$H$_{2n+1}$)$_2$—, —C(C$_n$F$_{2n+1}$)$_2$—, wherein 1≤n≤10, —C(=O)NH—, a substituted or unsubstituted C3 to C10 cycloalkylene group, a substituted or unsubstituted C2 to C10 heterocycloalkylene group, a substituted or unsubstituted C6 to C15 arylene group, and a substituted or unsubstituted C3 to C15 heteroarylene group.

The tetracarboxylic acid dianhydride represented by Chemical Formula 1 may include a tetracarboxylic acid dianhydride represented by Chemical Formula 1-1:

Chemical Formula 1-1

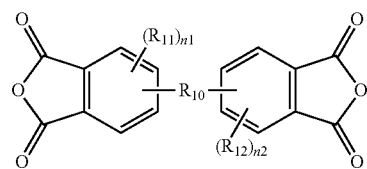

wherein in Chemical Formula 1-1, $R^{10}$ is a single bond, a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(C$_n$H$_{2n+1}$)$_2$—, —C(C$_n$F$_{2n+1}$)$_2$—, wherein 1≤n≤10, —C(=O)NH—, a substituted or unsubstituted C3 to C10 cycloalkylene group, a substituted or unsubstituted C2 to C10 heterocycloalkylene group, a substituted or unsubstituted C6 to C15 arylene group, or a substituted or unsubstituted C3 to C15 heteroarylene group, $R^{11}$ and $R^{12}$ are the same or different and are independently a halogen, a hydroxyl group, a substituted or unsubstituted C1 to C10 aliphatic organic group, a substituted or unsubstituted C6 to C20 aromatic organic group, a group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are the same or different and are independently a hydrogen or a C1 to C10 aliphatic organic group, n1 and n2 are the same or different and are independently an integer ranging from 0 to 3.

The tetracarboxylic acid dianhydride represented by Chemical Formula 1-1 may be a combination of a tetracarboxylic dianhydride represented by Chemical Formula 1-2 and a tetracarboxylic dianhydride represented by Chemical Formula 1-3:

Chemical Formula 1-2

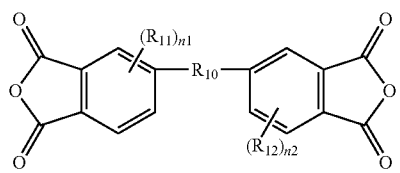

-continued

Chemical Formula 1-3

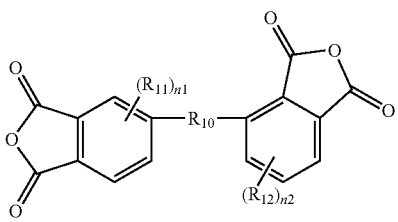

wherein in Chemical Formulae 1-2 and 1-3, $R_{10}$, $R_{11}$, $R_{12}$, n1, and n2 are the same as defined in Chemical Formula 1-1.

The tetracarboxylic acid dianhydride represented by Chemical Formula 1 may further include a tetracarboxylic acid dianhydride represented by Chemical Formula 1-4:

Chemical Formula 1-4

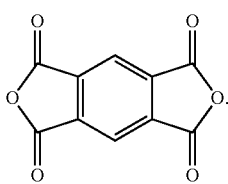

The tetracarboxylic acid dianhydride represented by Chemical Formula 1-1 may be a combination of a tetracarboxylic dianhydride represented by Chemical Formula 1-5 and a tetracarboxylic dianhydride represented by Chemical Formula 1-6:

Chemical Formula 1-5

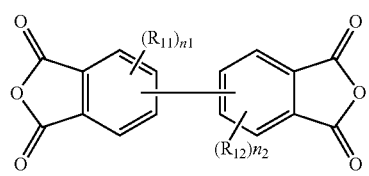

Chemical Formula 1-6

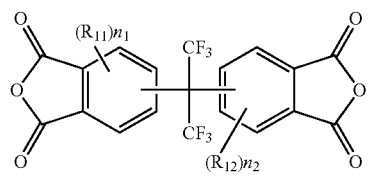

wherein in Chemical Formulae 1-5 and 1-6, $R_{11}$, $R_{12}$, n1, and n2 are the same as defined in Chemical Formula 1-1.

The inorganic particle may include two or more amino groups on its surface.

The inorganic particle may be an oxide, an alkoxide, a hydroxide, a carbonate, a carboxylate, a silicate, an aluminosilicate, a carbide, or nitride of at least one element selected from Ti, Si, Al, Zr, Zn, Sn, B, Ce, Sr, Ca, Ba, In, and W, or a graphene oxide, and a compound having an amino group end may be attached to a surface of the inorganic particle.

The amino group on the surface of the inorganic particle may react with a tetracarboxylic acid dianhydride represented by Chemical Formula 1 to form an imide.

The inorganic particle may be selected from $SiO_2$, $Al_2O_3$, $TiO_2$, $ZrO_2$, graphene oxide, ZnO, $SrCO_3$, $ZrW_2O_8$, antimony doped tin oxide, and Indium Tin Oxide.

The compound having an amino group end may be a silane coupling agent represented by Chemical Formula 3, or an alkoxymetallic compound:

Chemical Formula 3

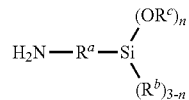

wherein in Chemical Formula 3, $R^a$ may be a substituted or unsubstituted C1 to C20 alkylene, a substituted or unsubstituted C2 to C20 alkenylene, a substituted or unsubstituted C2 to C20 alkynylene, a substituted or unsubstituted C3 to C20 cycloalkylene, a substituted or unsubstituted C3 to C20 cycloalkenylene, a substituted or unsubstituted C3 to C20 cycloalkynylene, a substituted or unsubstituted C6 to C18 arylene, or a substituted or unsubstituted C7 to C19 aralkylene, $R^b$ may be hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl, wherein the substituent may be an acryloxy group, a glycidoxy group, or an isocyanato group, $R^c$ may be hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl, and n is an integer ranging from 1 to 3.

The alkoxy metallic compound having an amino group end may include a titanate coupling agent, an aluminate coupling agent, a zirconium coupling agent, and the like.

The compound represented by Chemical Formula 3 may be 3-aminopropyl trimethoxysilane, 3-aminopropyl triethoxysilane, or 3-aminophenyl trimethoxysilane.

An amount of the inorganic particle may be less than or equal to about 5 percent by weight based on the total weight of a solid content of the polyimide, or an amount of the inorganic particle may be less than or equal to about 2 percent by volume based on the total volume of a solid content of the polyimide.

An amount of the inorganic particle may be from about 0.05 percent by weight to about 3 percent by weight based on the total weight of a solid content of the polyimide, or an amount of the inorganic particle may be from about 0.05 percent by volume to about 1 percent by volume based on the total volume of a solid content of the polyimide.

The inorganic particle may have an average size of from about 0.1 nanometers to about 200 nanometers, for example, from about 1 nanometer to about 150 nanometers, for example, from about 10 nanometers to about 100 nanometers.

The inorganic particle may have an aspect ratio of greater than 1, for example, of from about 1.5 to about 30, for example, from about 5 to about 20.

The inorganic particle having an aspect ratio of greater than 1 may have a short diameter of from about 1 nanometer to about 50 nanometers, and long diameter of from about 100 nanometers to about 300 nanometers.

The tetracarboxylic acid dianhydride represented by Chemical Formula 1 may be one or more selected from 2,3,3',4'-biphenyl tetracarboxylic dianhydride, 2,3,3',4'-diphenylsulfone tetracarboxylic dianhydride, 3,4'-oxydiphthalic anhydride, 3,3',4,4'-biphenyl tetracarboxylic dianhydride, bicyclo[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, and 4-(2,5-dioxotetrahydrofuran-3-yl)-1,2,3,4-tetrahydronaphthalene-1,2-dicarboxylic anhydride.

The diamine represented by Chemical Formula 2 may be one or more selected from chemical formulae:

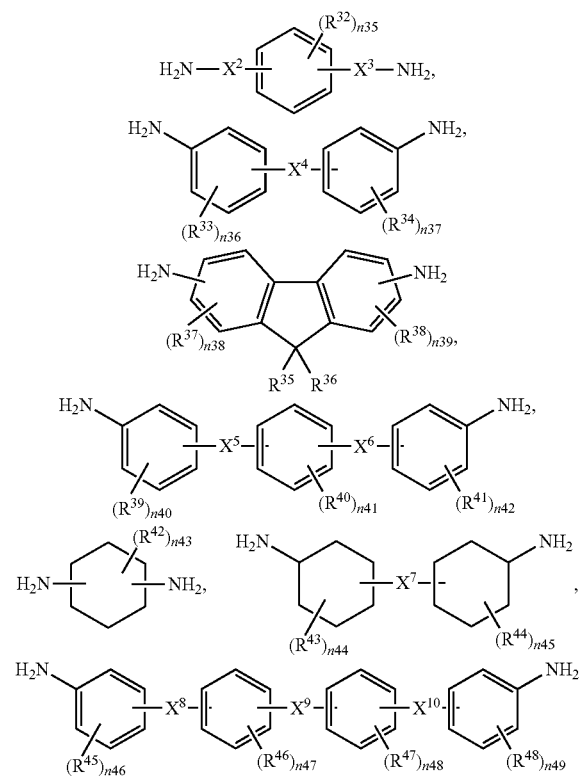

wherein, in the chemical formulae, $R^{32}$ to $R^{52}$ are the same or different and may each independently be a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C3 to C15 heteroaryl group, $X^2$ to $X^{12}$ are the same or different and may each independently be a single bond, a substituted or unsubstituted C1 to C10 alkylene group, a substituted or unsubstituted C3 to C10 cycloalkylene group, a substituted or unsubstituted C2 to C10 heterocycloalkylene group, a substituted or unsubstituted C6 to C15 arylene group, a substituted or unsubstituted C3 to C15 heteroarylene group, —SO$_2$—, —O—, —C(=O)—, a group selected from chemical formulae:

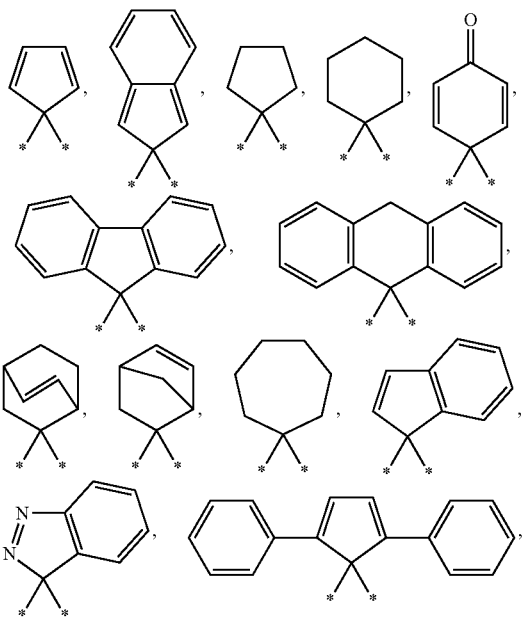

or a combination thereof, n35 to n37, and n40 to n49, are integers ranging from 0 to 4, and n38 and n39 are integers ranging from 0 to 3.

The diamine may be selected from compounds represented by chemical formulae, and a combination thereof:

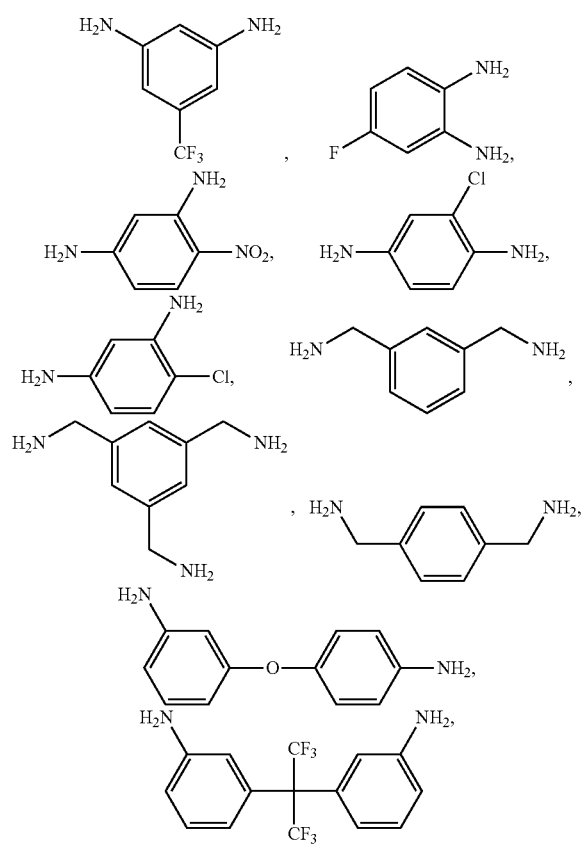

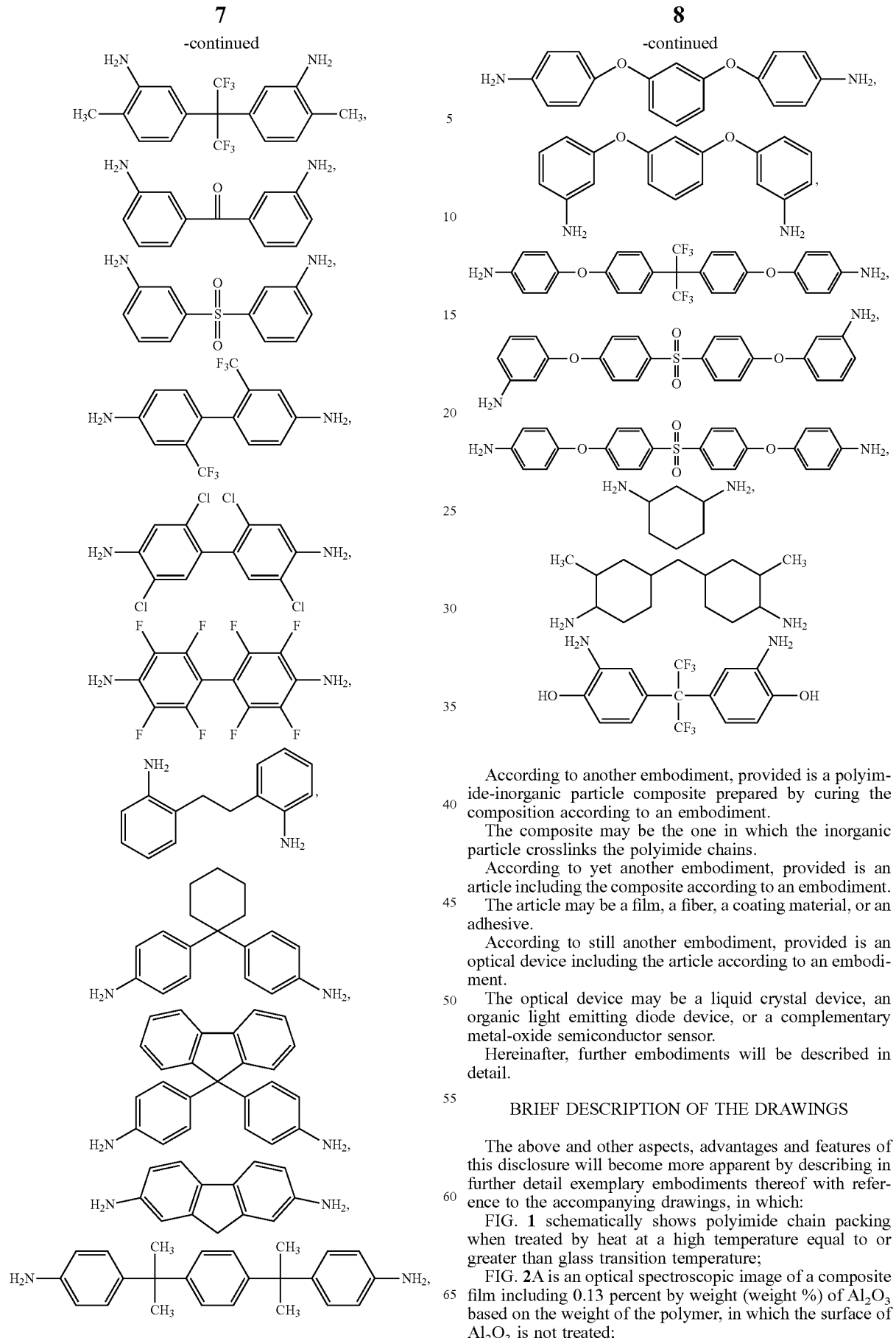

According to another embodiment, provided is a polyimide-inorganic particle composite prepared by curing the composition according to an embodiment.

The composite may be the one in which the inorganic particle crosslinks the polyimide chains.

According to yet another embodiment, provided is an article including the composite according to an embodiment.

The article may be a film, a fiber, a coating material, or an adhesive.

According to still another embodiment, provided is an optical device including the article according to an embodiment.

The optical device may be a liquid crystal device, an organic light emitting diode device, or a complementary metal-oxide semiconductor sensor.

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
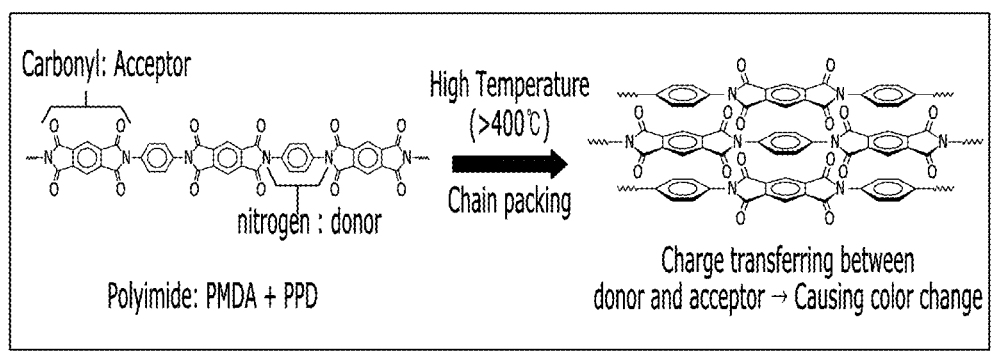
FIG. 1 schematically shows polyimide chain packing when treated by heat at a high temperature equal to or greater than glass transition temperature.

This disclosure will be described more fully hereinafter with reference to the accompanying drawings, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing present embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/ or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (—F, —Br, —Cl, or —I), a hydroxyl group, a nitro group, a cyano group, an amino group (—$NH_2$, —$NH(R^{100})$ or —$N(R^{101})(R^{102})$, wherein $R^{100}$, $R^{101}$, and $R^{102}$ are the same or different, and are each independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, the substituents may be linked to each other to provide a ring.

As used herein, the term "alkyl group" refers to a straight or branched chain saturated aliphatic hydrocarbon group having the specified number of carbon atoms and having a valence of one. Non-limiting examples of the alkyl group are methyl, ethyl, and propyl.

As used herein, the term "fluoroalkyl group" refers to an alkyl group as defined above, wherein one or more hydrogen atoms are substituted with a fluorine atom. Non-limiting examples of the fluoroalkyl group are fluoromethyl, 2-fluoroethyl, and 3-fluoropropyl.

As used herein, the term "alkoxy group" refers to "alkyl-O—", wherein the term "alkyl" has the same meaning as described above. Non-limiting examples of the alkoxy group are methoxy, ethoxy, propoxy, and butoxy.

As used herein, the term "cycloalkyl group" refers to a monovalent group having one or more saturated rings in which all ring members are carbon. Non-limiting examples of the cycloalkyl group are cyclopentyl and cyclohexyl.

As used herein, the term "heterocycloalkyl group" refers to a cycloalkyl group as defined above, wherein one or more of the ring carbon atoms are replaced with a heteroatom selected from O, S, N, P, and Si. Non-limiting example of the heterocycloalkyl group is 2-oxacyclohexyl(2-tetrahydropyranyl).

As used herein, the term "cycloalkoxy group" refers to "cycloalkyl-O—", wherein the term "cycloalkyl" has the same meaning as described above. Non-limiting examples of the cycloalkoxy group are cyclopropoxy and cyclohexyloxy.

As used herein, the term "aryl group", which is used alone or in combination, refers to an aromatic hydrocarbon group containing at least one ring. Non-limiting examples of the aryl group are phenyl, naphthyl, and tetrahydronaphthyl.

As used herein, the term "aryloxy group" refers to "aryl-O—", wherein the term "aryl" has the same meaning as described above. Non-limiting examples of the aryloxy group are phenoxy and naphthyloxy.

As used herein, the term "heteroaryl group" refers to an aryl group as defined above, wherein one or more of the ring carbon atoms are replaced with a heteroatom selected from O, S, N, P, and Si. Non-limiting example of the heteroaryl group are 2-pyridyl and 2-furanyl.

As used herein, the terms "alkylene group", "cycloalkylene group", "heterocycloalkylene group", "arylene group", and "heteroarylene group" refer to a divalent group respectively derived from an alkyl group, a cycloalkyl group, a heterocycloalkyl group, an aryl group, and a heteroaryl group as defined above.

As used herein, when a specific definition is not otherwise provided, the term "alkyl group" refers to a C1 to C30 alkyl group, for example a C1 to C15 alkyl group, the term "fluoroalkyl group" refers to a C1 to C30 fluoroalkyl group, the term "cycloalkyl group" refers to a C3 to C30 cycloalkyl group, for example a C3 to C18 cycloalkyl group, the term "alkoxy group" refer to a C1 to C30 alkoxy group, for example a C1 to C18 alkoxy group, the term "ester group" refers to a C2 to C30 ester group, for example a C2 to C18 ester group, the term "ketone group" refers to a C2 to C30 ketone group, for example a C2 to C18 ketone group, the term "aryl group" refers to a C6 to C30 aryl group, for example a C6 to C18 aryl group, the term "alkenyl group" refers to a C2 to C30 alkenyl group, for example a C2 to C18 alkenyl group, the term "alkynyl group" refers to a C2 to C30 alkynyl group, for example a C2 to C18 alkynyl group, the term "alkylene group" refers to a C1 to C30 alkylene group, for example a C1 to C18 alkylene group, the term "cycloalkylene group" refers to a C3 to C30 cycloalkylene group, and the term "arylene group" refers to a C6 to C30 arylene group, for example a C6 to C16 arylene group.

As used herein, when a specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group comprising one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein 1≤p≤10, —(CF$_2$)$_q$—, wherein $1 \leq q \leq 10$, —C(CH$_3$)$_2$—, —C(CF$_3$)$_2$—, and —C(=O)NH—, for example through —S(=O)$_2$—, for example an aryl group or a C6 to C30 arylene group, for example a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, for example a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof, in one ring.

As used herein, when a definition is not otherwise provided, "combination" commonly refers to mixing or copolymerization.

As used herein, the term "polyimide" may refer to not only the "polyimide", but also "polyimide", "polyamic acid", or a combination thereof. Further, the terms "polyimide" and "polyamic acid" may be understood as having the same meaning.

In addition, in the specification, the mark "*" may refer to a point of attachment to another atom.

According to an embodiment, provided is a composition for preparing a polyimide-inorganic particle composite, including:
a tetracarboxylic acid dianhydride represented by Chemical Formula 1,
a diamine represented by Chemical Formula 2, and
an inorganic particle including an amino group on its surface:

Chemical Formula 1

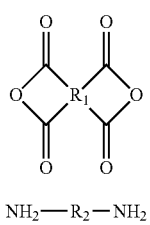

Chemical Formula 2

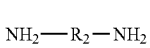

wherein in Chemical Formula 1 and Chemical Formula 2,
$R^1$ and $R^2$ are the same or different, and are each independently a substituted or unsubstituted C4 to C30 alicyclic organic group, or a substituted or unsubstituted C6 to C30 aromatic organic group, wherein the alicyclic or aromatic organic group includes one ring, two or more rings fused together to provide a condensed ring system, or two or more rings linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein $1 \leq p \leq 10$, —(CF$_2$)$_q$— wherein $1 \leq q \leq 10$, —C(C$_n$H$_{2n+1}$)$_2$—, —C(C$_n$F$_{2n+1}$)$_2$—, wherein $1 \leq n \leq 10$, —C(=O)NH—, a substituted or unsubstituted C3 to C10 cycloalkylene group, a substituted or unsubstituted C2 to C10 heterocycloalkylene group, a substituted or unsubstituted C6 to C15 arylene group, and a substituted or unsubstituted C3 to C15 heteroarylene group.

The tetracarboxylic acid dianhydride represented by Chemical Formula 1 may include a tetracarboxylic acid dianhydride represented by Chemical Formula 1-1:

Chemical Formula 1-1

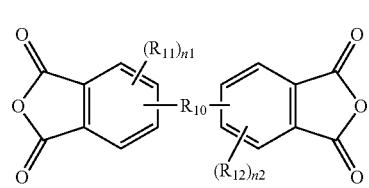

wherein in Chemical Formula 1-1,
$R^{10}$ is a single bond, a fluorenylene group, —O—, —S—, —C(=O)—, —CH(OH)—, —S(=O)$_2$—, —Si(CH$_3$)$_2$—, —(CH$_2$)$_p$— wherein $1 \leq p \leq 10$, —(CF$_2$)$_q$— wherein $1 \leq q \leq 10$, —C(C$_n$H$_{2n+1}$)$_2$—, —C(C$_n$F$_{2n+1}$)$_2$—, wherein $1 \leq n \leq 10$, —C(=O)NH—, a substituted or unsubstituted C3 to C10 cycloalkylene group, a substituted or unsubstituted C2 to C10 heterocycloalkylene group, a substituted or unsubstituted C6 to C15 arylene group, or a substituted or unsubstituted C3 to C15 heteroarylene group,
$R^{11}$ and $R^{12}$ are the same or different and are independently a halogen, a hydroxyl group, a substituted or unsubstituted C1 to C10 aliphatic organic group, a substituted or unsubstituted C6 to C20 aromatic organic group, a group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are the same or different and are independently a hydrogen or a C1 to C10 aliphatic organic group,
n1 and n2 are the same or different and are independently an integer ranging from 0 to 3.

The tetracarboxylic acid dianhydride represented by Chemical Formula 1-1 may be a combination of a tetracarboxylic dianhydride represented by Chemical Formula 1-2 and a tetracarboxylic dianhydride represented by Chemical Formula 1-3:

Chemical Formula 1-2

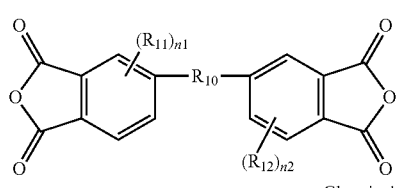

Chemical Formula 1-3

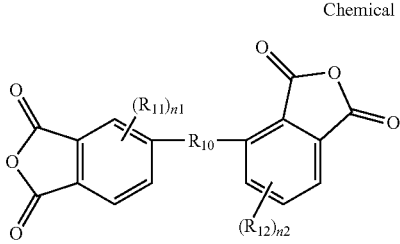

wherein in Chemical Formulae 1-2 and 1-3,
R$_{10}$, R$_{11}$, R$_{12}$, n1, and n2 are the same as defined in Chemical Formula 1-1.

The tetracarboxylic acid dianhydride represented by Chemical Formula 1 may further include pyromellitic acid dianhydride (PMDA) represented by Chemical Formula 1-4:

Chemical Formula 1-4

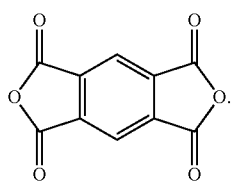

In an embodiment, the tetracarboxylic acid dianhydride represented by Chemical Formula 1 may be a combination of the tetracarboxylic acid dianhydride represented by Chemical Formula 1-1 and tetracarboxylic acid dianhydride represented by Chemical Formula 1-4. For example, the tetracarboxylic acid dianhydride represented by Chemical Formula 1 may be a combination of 3,3',4,4'-biphenyltetracarboxylic dianhydride (BPDA) and pyromellitic acid dianhydride (PMDA).

The tetracarboxylic acid dianhydride represented by Chemical Formula 1-1 may be a combination of a tetracarboxylic dianhydride represented by Chemical Formula 1-5 and a tetracarboxylic dianhydride represented by Chemical Formula 1-6:

Chemical Formula 1-5

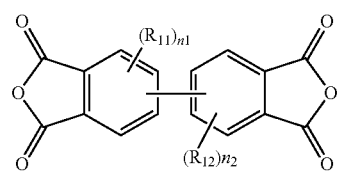

Chemical Formula 1-6

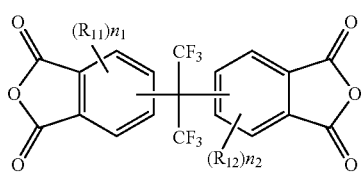

wherein in Chemical Formulae 1-5 and 1-6, $R_{11}$, $R_{12}$, n1, and n2 are the same as defined in Chemical Formula 1-1.

In Chemical Formulae 1-1, 1-2, 1-3, 1-4, 1-5 and 1-6, both n1 and n2 may be 0.

Polyimide has high transmittance for light, high thermal stability, high mechanical strength, flexibility, and the like, and thus is useful for a display substrate. In the course of fabricating a display device, exposure of the polyimide to high temperature of equal to or greater than 350° C., in the processes such as, for example, high temperature deposition, high temperature annealing, and the like, is generally required. When treating polyimide at a high temperature, which is greater than the glass transition temperature, molecules of polyimide rearrange and polymer chain packing occurs. In this case, as shown in FIG. 1, for example, a Charge Transfer Complex, i.e., CTC, is formed as the electron donor molecules and electron acceptor molecules are positioned closer to each other. As a result, the polyimide film may absorb light in a specific wavelength range due to the electron transfer (excitation) among charges resulting therefrom. This rearrangement causes lowering of transmittance for light, which is essential for fabricating a display, in a wavelength range of equal to or less than 430 nanometers, thus making the film yellow. This phenomena, which is called "yellowing", makes it difficult to use polyimide film in the transparent display device that requires a high temperature process.

The composition according to an embodiment may produce a polyimide having a high transmittance for light in a range of short wavelength, without forming a 'CTC' at a high temperature by preventing polyimide from forming polymer chain packing. The composition according to an embodiment may result a polyimide composite in which inorganic particles are evenly distributed among polymer chains of polyimide. As a result, the mobility of molecules of polyimide may become restricted, and thus the polymer chain packing may be inhibited even upon treatment at a high temperature.

Further, the inorganic particle includes an amino group on its surface, which may also participate in the in-situ polymerization reaction with the tetracarboxylic acid dianhydride present in the composition, at the time of polymerization between the diamine and the tetracarboxylic acid dianhydride. That is, the inorganic particles are not just distributed in the polyimide-inorganic particle composite prepared from the composition, but also participate in forming polyamic acid, whereby the polyamic acids prepared from the composition are grafted by the inorganic particles at their side chains. Further, when the inorganic particle includes two or more amino groups on its surface, the inorganic particle may bind to the anhydride termini of two or more different polyamic acids, and the polyamic acids may be crosslinked by the inorganic particle as a result. Accordingly, distribution of the inorganic particles may become better, and the prepared polyimide-inorganic particle composite may have improved mechanical and thermal properties, as well as good transmittance for light after being treated at a high temperature, as formation of 'CTC' in the polyimide may be suppressed.

Figure 2A:
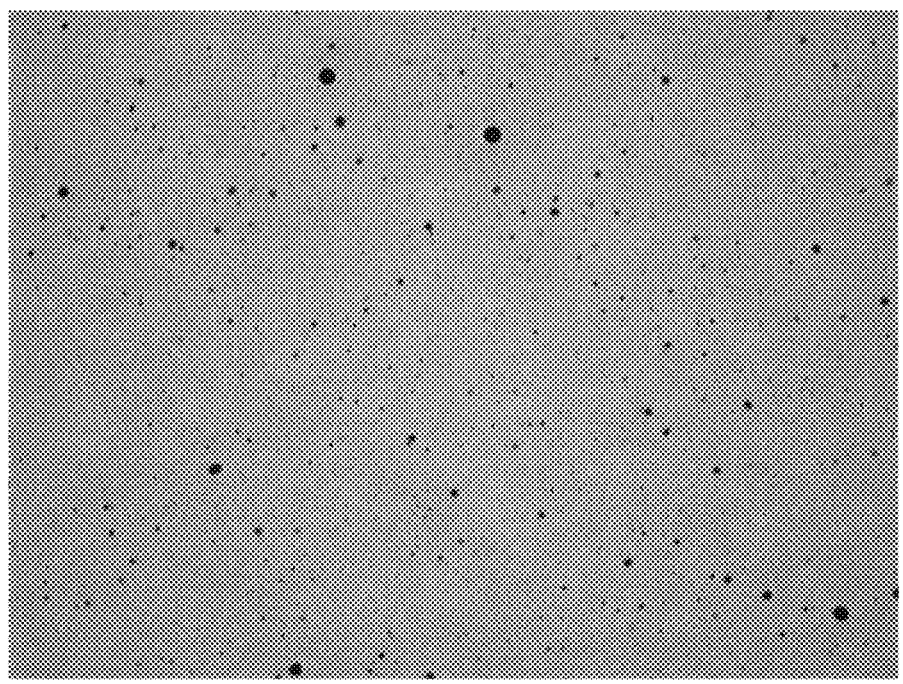
FIG. 2A is an optical spectroscopic image of a composite film including 0.13 percent by weight (weight %) of $Al_2O_3$ based on the weight of the polymer, in which the surface of $Al_2O_3$ is not treated.

FIG. 2A is an optical spectroscopic image of polyimide-inorganic particle composite film prepared by adding $Al_2O_3$ particles having an average particle size of about 50 nanometers (nm) in an amount of 0.13 percent by weight (weight %) based on the weight of solid content of the polymer, in which the $Al_2O_3$ particles are not treated at their surfaces.

Figure 2B:
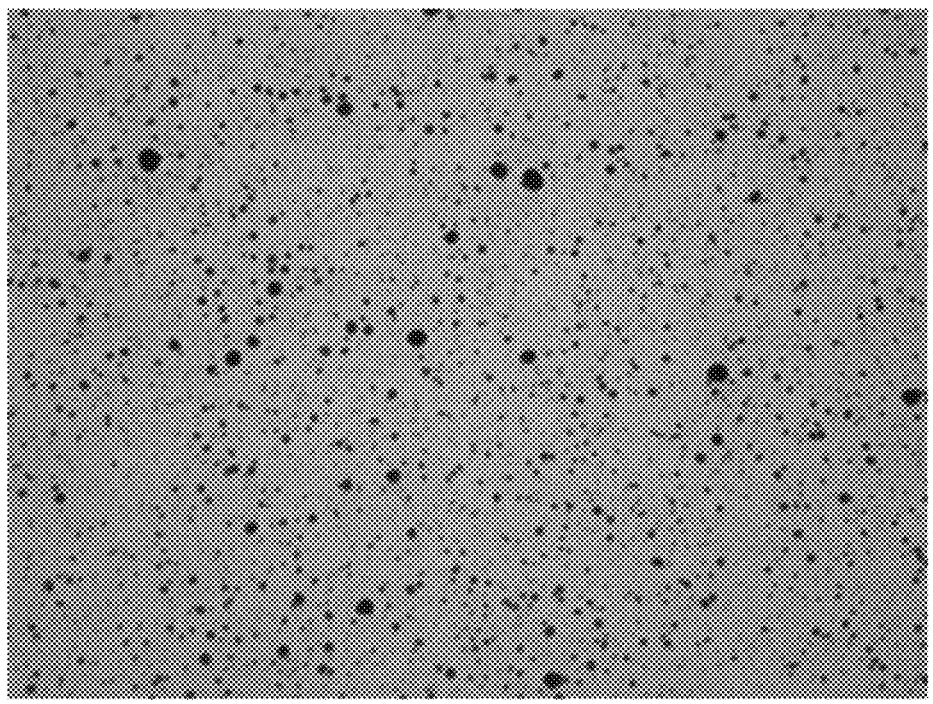
FIG. 2B is an optical spectroscopic image of a composite film including 0.71 percent by weight (weight %) of $Al_2O_3$ based on the weight of polymer, in which the surface of $Al_2O_3$ is not treated.

FIG. 2B is an optical spectroscopic image of polyimide-inorganic particle composite film prepared by adding $Al_2O_3$ particles having an average particle size of about 50 nanometers in an amount of 0.71 weight % based on the weight of solid content of the polymer, in which the $Al_2O_3$ particles are not treated at their surfaces.

Figure 3A:
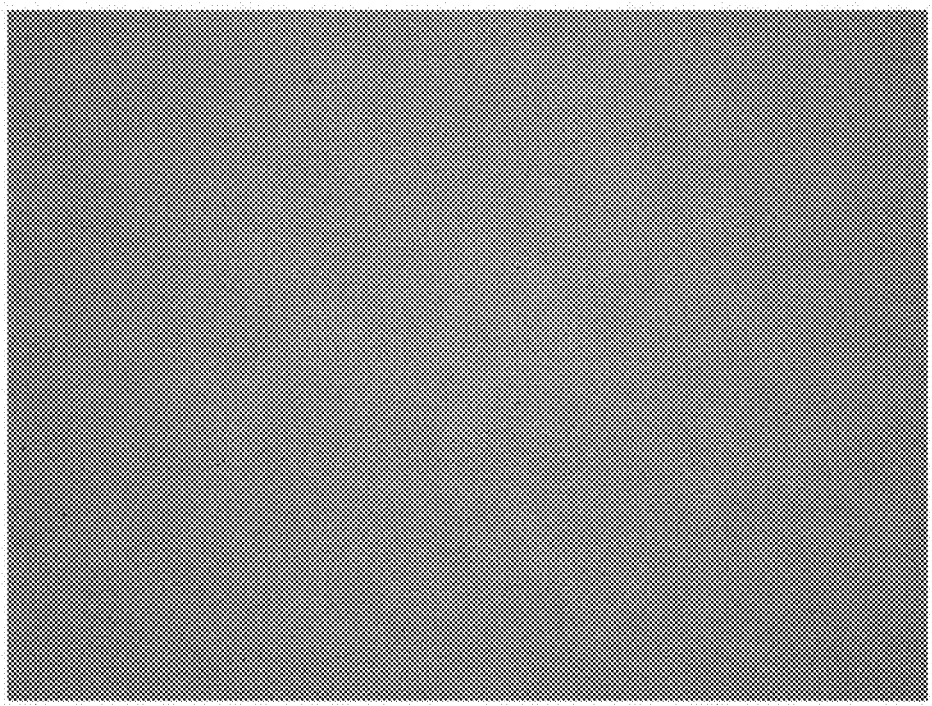
FIG. 3A is an optical spectroscopic image of a composite film including 0.13 percent by weight (weight %) of $Al_2O_3$ based on the weight of polymer, in which the surface of $Al_2O_3$ is treated with 3-aminophenyl trimethoxysilane coupling agent.

FIG. 3A is an optical spectroscopic image of polyimide-inorganic particle composite film prepared by adding $Al_2O_3$ particles having an average particle size of about 50 nanometers in an amount of 0.13 weight % based on the weight of solid content of the polymer, in which the $Al_2O_3$ particles are treated with 3-aminophenyl trimethoxysilane coupling agent at their surfaces.

Figure 3B:
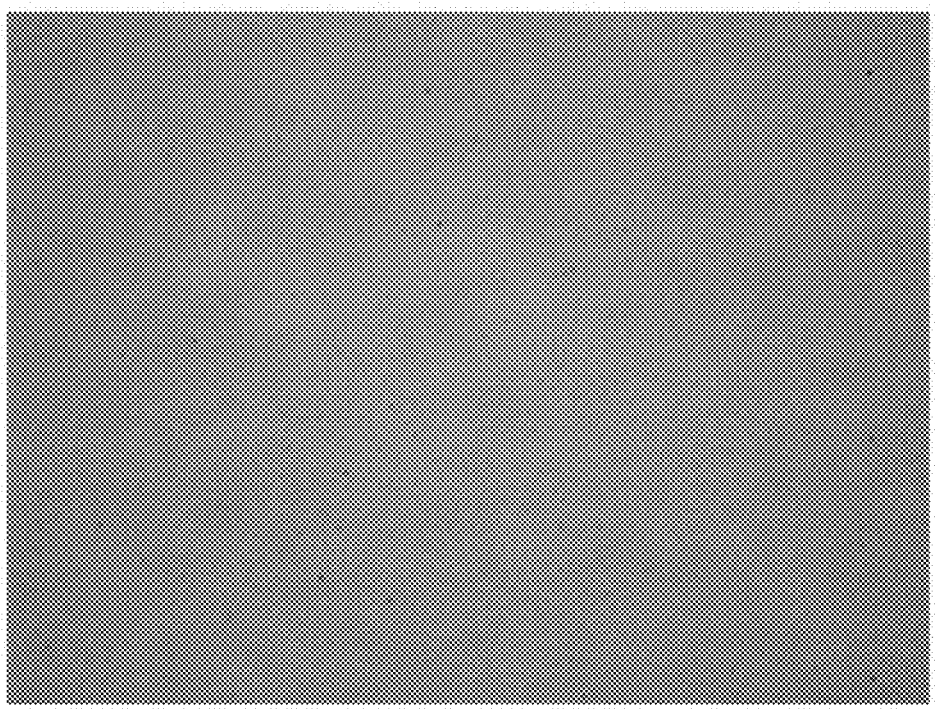
FIG. 3B is an optical spectroscopic image of a composite film including 0.71 percent by weight (weight %) of $Al_2O_3$ based on the weight of polymer, in the surface of $Al_2O_3$ is treated with 3-aminophenyl trimethoxysilane coupling agent.

FIG. 3B is an optical spectroscopic image of polyimide-inorganic particle composite film prepared by adding $Al_2O_3$ particles having an average particle size of about 50 nanometers in an amount of 0.71 weight % based on the weight of solid content of the polymer, in which the $Al_2O_3$ particles are treated with 3-aminophenyl trimethoxysilane coupling agent at their surfaces.

As shown from FIGS. 2A to 3B, distribution of inorganic particles in the composite may be improved by treating the surface of the particle to prepare a particle having an amino group on its surface.

In an exemplary embodiment, the inorganic particle including an amino group on its surface may be prepared by binding a compound having an amino group at one end to a surface of an oxide, an alkoxide, a hydroxide, a carbonate, a carboxylate, a silicate, an aluminosilicate, a carbide, or a nitride of at least one element selected from Ti, Si, Al, Zr, Zn, Sn, B, Ce, Sr, Ca, Ba, In, and W, or of a graphene oxide. For example, the inorganic particle may be $SiO_2$, $Al_2O_3$, $TiO_2$, $ZrO_2$, graphene oxide, ZnO, $SrCO_3$, $ZrW_2O_8$, antimony doped tin oxide, or ITO (Indium Tin Oxide), but is not limited thereto.

The compound having an amino group at one end may be any compound, as long as it has an amino group at one end and a functional group capable of binding to the inorganic particle at another end.

For example, the compound having an amino group at one end may be represented by Chemical Formula 3:

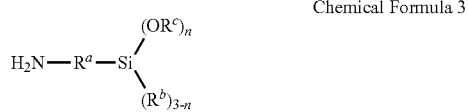

Chemical Formula 3

In Chemical Formula 3, $R^a$ may be a substituted or unsubstituted C1 to C20 alkylene, a substituted or unsubstituted C2 to C20 alkenylene, a substituted or unsubstituted C2 to C20 alkynylene, a substituted or unsubstituted C3 to C20 cycloalkylene, a substituted or unsubstituted C3 to C20 cycloalkenylene, a substituted or unsubstituted C3 to C20 cycloalkynylene, a substituted or unsubstituted C6 to C18 arylene, or a substituted or unsubstituted C7 to C19 aralkylene, $R^b$ may be hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl, wherein the substituent may be an acryloxy group, a glycidoxy group, or an isocyanato group, $R^c$ may be hydrogen, a substituted or unsubstituted C1 to C20 alkyl group, a substituted or unsubstituted C2 to C20 alkenyl group, a substituted or unsubstituted C2 to C20 alkynyl group, a substituted or unsubstituted C3 to C20 cycloalkyl group, or a substituted or unsubstituted C6 to C18 aryl group, and n is an integer ranging from 1 to 3.

The compound represented by Chemical Formula 3 may be selected from a substituted or unsubstituted w-aminoalkyl trialkoxysilane or a substituted or unsubstituted aminoaryl trialkoxysilane. In this regard, the term w-aminoalkyl indicates that the amino group is located at the terminal end of the alkyl group. Non-limiting examples of the ω-aminoalkyl group are 2-aminoethyl group, 3-aminopropyl group, 4-aminobutyl group, and 5-aminopentyl group.

Aminoaryl trialkoxysilane indicates a compound having an aminoaryl group to which an amino group is bound. Non-limiting examples of the aminoaryl group include aminophenyl group, aminonaphtyl group, and aminoanthracenyl group.

The compound represented by Chemical Formula 3 may include 3-aminopropyl trimethoxysilane (APS), 3-aminopropyl triethoxysilane, 3-aminophenyl trimethoxysilane, and the like, but is not limited thereto.

In an exemplary embodiment, if the monomers of the polyimide include an aromatic group, 3-aminophenyl trimethoxysilane may be used as the compound represented by Chemical Formula 3, as it may contribute to the improvement of stability in the polyimide-inorganic particle composite due to its structural similarity of phenyl group to the aromatic group in the polymer.

The compound having an amino group at one end may also include an alkoxy metallic compound having an amino group at one end, such as, for example, a titanate coupling agent, an aluminate coupling agent, a zirconium coupling agent, and the like.

Figure 5:
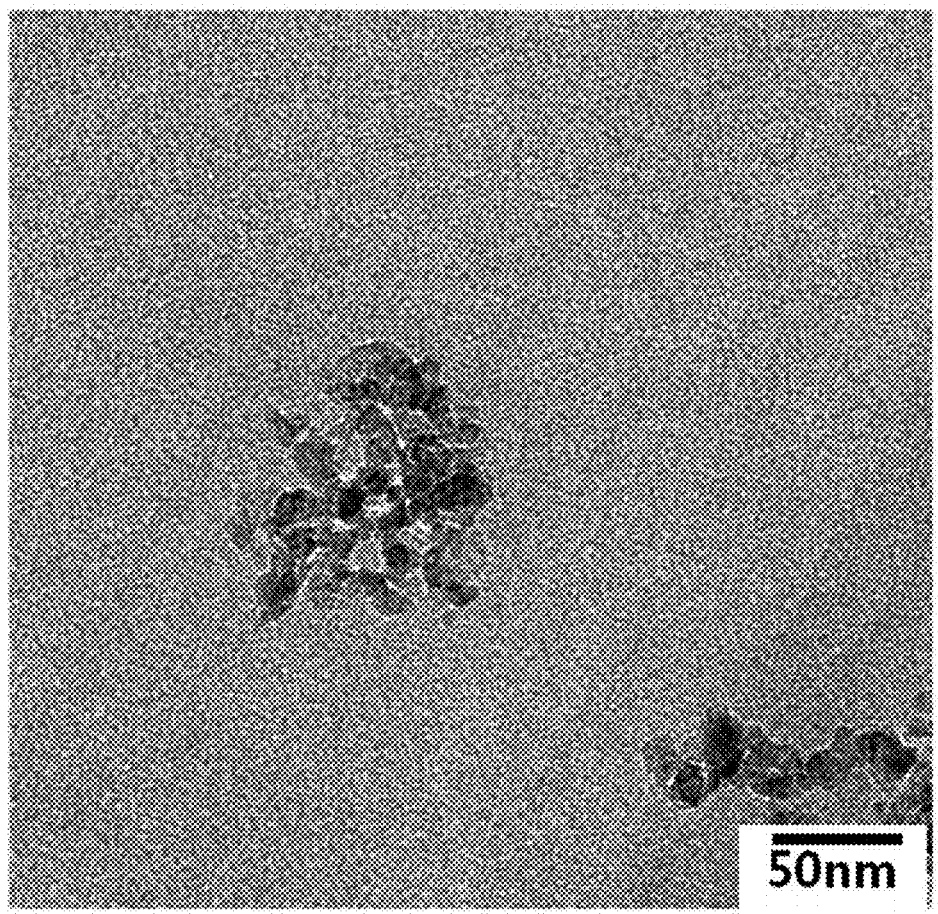
FIG. 5 is a transmission electron microscopy (TEM) image of a polyimide-inorganic particle nanocomposite film prepared by mixing $Al_2O_3$ treated with 3-aminophenyl trimethoxysilane coupling agent on its surface with the monomers of poly(amic acid), and mixing and reacting the mixture by using a stirrer.

As described above, the inorganic particle having an amino group on its surface may evenly be distributed among polyimide through the in-situ polymerization in the composition. Accordingly, when fabricating a polyimide-inorganic particle composite film by mixing and reacting the composition including the inorganic particles by using a conventional stirrer, as shown from FIG. 5, only a few aggregates of nanoparticles having a size of about 50 nanometers to about 100 nanometers are present in the composite film.

Figure 4:
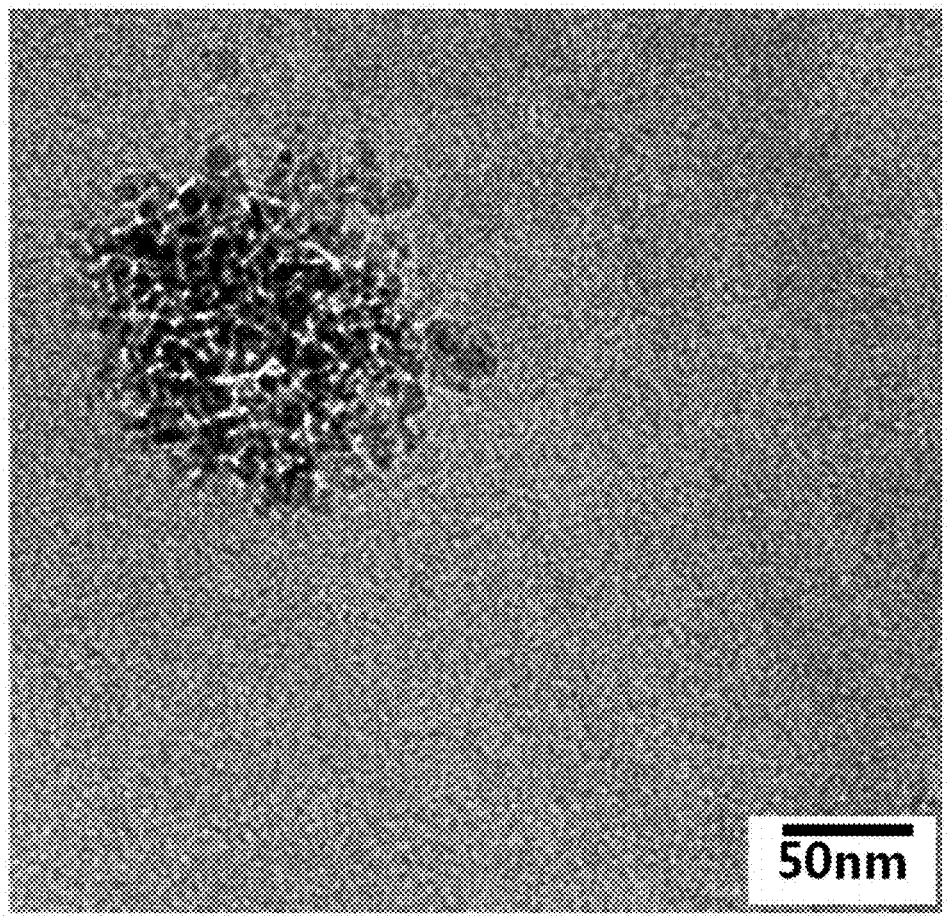
FIG. 4 is transmission electron microscopy (TEM) image of a polyimide-inorganic particle nanocomposite film prepared by mixing $Al_2O_3$ treated with 3-aminophenyl trimethoxysilane coupling agent on its surface with a poly (amic acid), and by mixing and reacting the mixture by using a Past Mixer.

Meanwhile, when fabricating a polyimide-inorganic particle composite film by adding the same inorganic particles to the prepared polyamic acid solution, mixing them with the aid of Past Mixer (Daewha Tech Com., Ltd., PDM-300) at a revolving speed of 800 revolutions per minute (rpm) and a speed of rotation of 600 rpm for 30 minutes, and polymerizing them, as shown from FIG. 4, aggregates of nanoparticles having a size of equal to or greater than 100 nanometers are present in the composite film.

Accordingly, by using the composition according to an embodiment including an inorganic particle having an amino group on its surface together with the monomers of polyimide, it is possible to prepare a polyimide-inorganic particle composite having higher distribution of the inorganic particles with lower energy due to the in-situ polymerization of the inorganic particle.

In an exemplary embodiment, the inorganic particle including an amino group on its surface may be included in an amount of less than or equal to about 5 weight % based on the total weight of the solid content of the polyimide prepared, or in an amount of less than or equal to about 2 volume % based on the total volume of the solid content of the polyimide prepared.

In an exemplary embodiment, the inorganic particle including an amino group on its surface may be included in an amount of from about 0.05 weight % to about 3.0 weight %, for example, from about 0.1 weight % to about 2.0 weight %, for example, from about 0.2 weight % to about 1.5 weight %, for example, 0.3 weight % to about 0.8 weight %, based on the total weight of the solid content of the polyimide prepared.

Alternatively, in an exemplary embodiment, the inorganic particle including an amino group on its surface may be included in an amount of from about 0.05 volume % to about 1.0 volume %, for example, from about 0.1 volume % to about 0.8 volume %, for example, from about 0.15 volume % to about 0.75 volume %, for example, from about 0.2 volume % to about 0.7 volume %, for example, from about 0.25 volume % to about 0.65 volume %, based on the total volume of the solid content of the polyimide prepared.

As described above, although the inorganic particles are included in the composition in a very small amount compared to the solid content of the polyimide, the particles contribute to a drastic improvement of transmittance for light. As shown in the Examples described below in detail, the polyimide-inorganic particle composite film prepared from the composition does not show or shows a substantially reduced UV absorbance peak at 430 nanometers indicating polymer chain packing at a temperature of greater than the glass transition temperature. This improvement of transmittance for light rarely occurs at a temperature of equal to or lower than 300° C., which is lower than the glass transition temperature of polyimide. This indicates that the effects of the addition of the inorganic particle may result from inhibition of polymer chain packing upon heat treatment. Based on the total amount of polymer, even a small amount of the inorganic particles may sufficiently impede formation of CTC by inhibiting polymer chain packing at a temperature of equal to or greater than the glass transition temperature.

The inorganic particle including an amino group on its surface may have an average particle size of from about 0.1 nanometers to about 200 nanometers, for example, from about 1 nanometer to about 150 nanometers, for example, from about 10 nanometers to about 100 nanometers.

The inorganic particle including an amino group on its surface may have an aspect ratio of greater than 1, for example, of from about 1.5 to about 30, for example, from about 5 to about 20.

The inorganic particle having an aspect ratio of greater than 1 may have a short diameter of from about 1 nanometer to about 50 nanometers, and a long diameter of from about 100 nanometers to about 300 nanometers. For example, the short diameter of the inorganic particle may be from about 10 nanometers to about 20 nanometers, and the long diameter of the inorganic particle may be from about 200 nanometers to about 300 nanometers.

The tetracarboxylic acid dianhydride represented by Chemical Formula 1 may be one or more selected from 2,3,3',4'-biphenyltetracarboxylic dianhydride, 2,3,3',4'-diphenylsulfone tetracarboxylic dianhydride, 3,4'-oxydiphthalic anhydride, 3,3',4,4'-biphenyltetracarboxylic dianhydride, bicyclo[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, and 4-(2,5-dioxotetrahydrofuran-3-yl)-1,2,3,4-tetrahydronaphthalene-1,2-dicarboxylic anhydride, but is not limited thereto.

The diamine represented by Chemical Formula 2 may be one or more selected from chemical formulae:

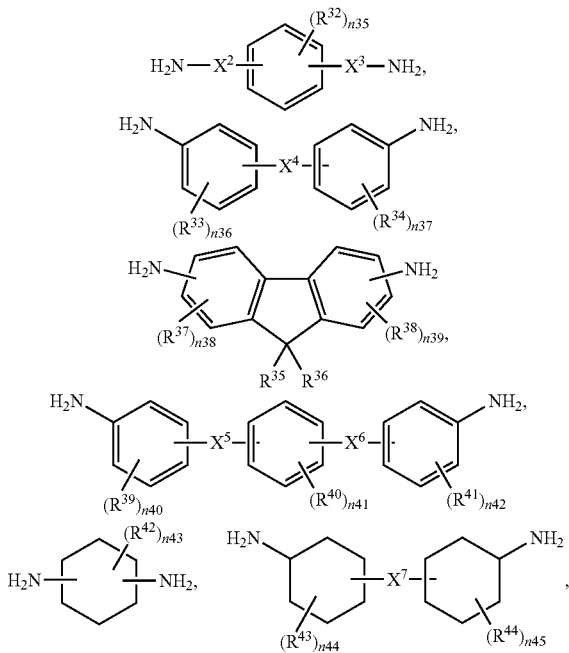

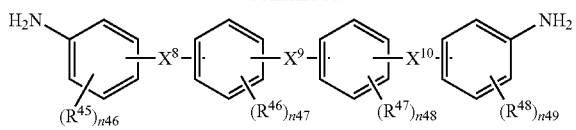

wherein in the above chemical formulae, $R^{32}$ to $R^{52}$ are the same or different and may each independently be a halogen, a nitro group, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkoxy group, a substituted or unsubstituted C6 to C15 aryl group, a substituted or unsubstituted C6 to C15 aryloxy group, or a substituted or unsubstituted C3 to C15 heteroaryl group, $X^2$ to $X^{12}$ are the same or different and may each independently be a single bond, a substituted or unsubstituted C1 to C10 alkylene group, a substituted or unsubstituted C3 to C10 cycloalkylene group, a substituted or unsubstituted C2 to C10 heterocycloalkylene group, a substituted or unsubstituted C6 to C15 arylene group, a substituted or unsubstituted C3 to C15 heteroarylene group, —SO$_2$—, —O—, —C(=O)—, a group selected from chemical formulae:

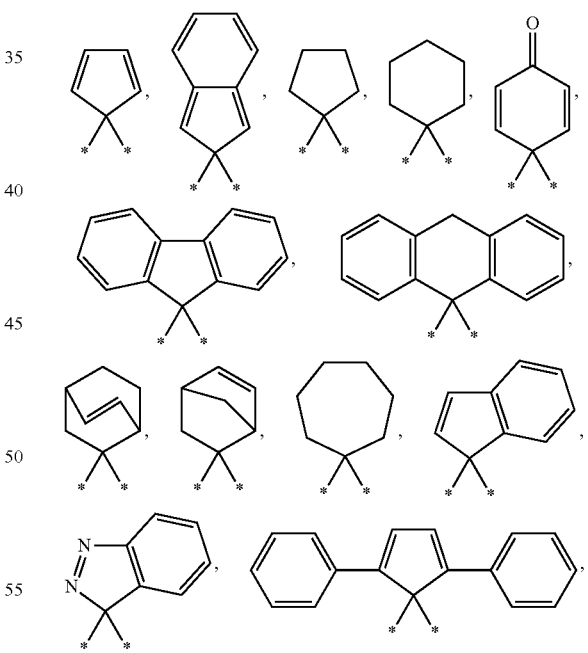

or a combination thereof, n35 to n37, and n40 to n49, are integers ranging from 0 to 4, and n38 and n39 are integers ranging from 0 to 3.

The diamine may be selected from compounds represented by the following chemical formulae, and a combination thereof.

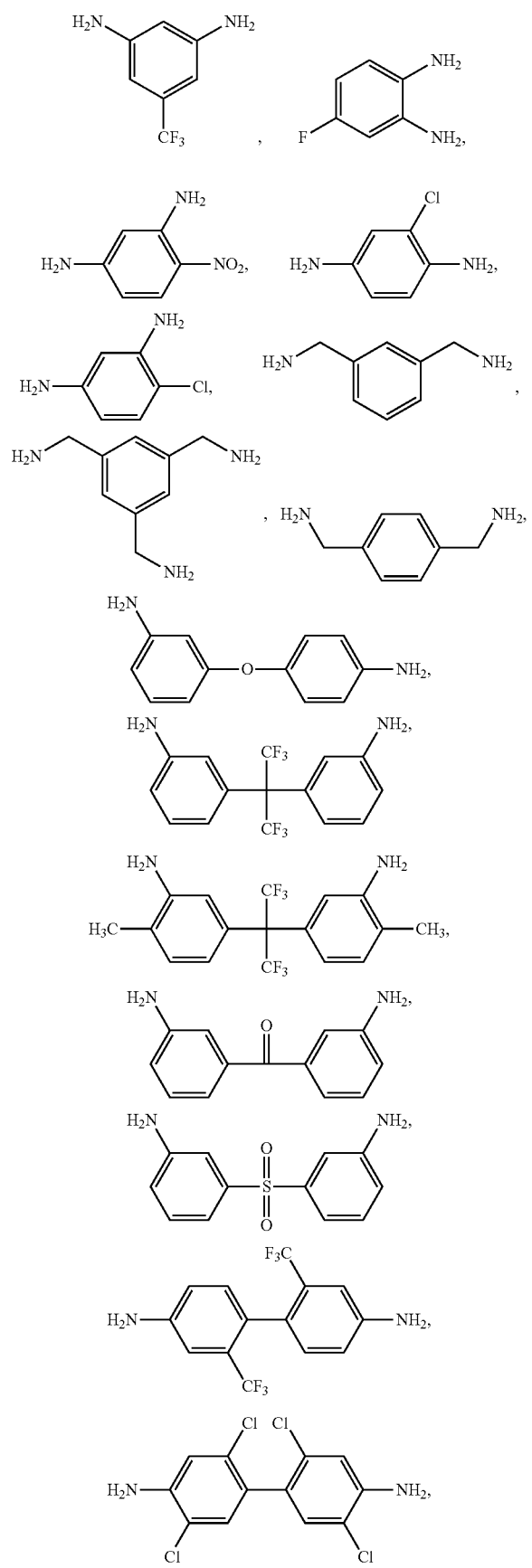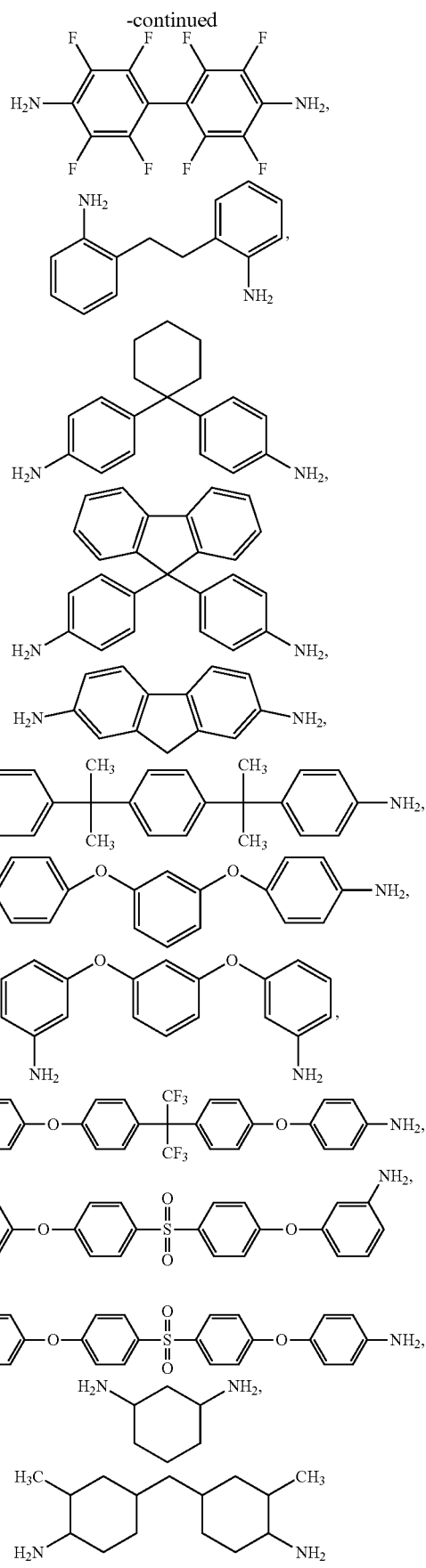

-continued

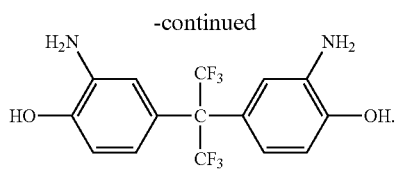

The composition according to an embodiment, as described above, may be used to prepare a polyimide-inorganic particle composite through in-situ polymerization reaction between the monomers of polyimide and the inorganic particles having an amino group on their surfaces. For example, the polyimide-inorganic particle composite may be prepared by reacting the tetracarboxylic acid dianhydride and the inorganic particles having an amino group on their surfaces in a solvent, adding the diamine to be polymerized, and curing the same.

Alternatively, for example, the polyimide-inorganic particle composite may be prepared by mixing first the diamine and the inorganic particles having amino groups on their surface in a solvent, adding tetracarboxylic dianhydride thereto, reacting the mixture, and curing the same.

The composition for preparing a polyimide-inorganic particle composite may further include a solvent. The solvent may be an aprotic polar solvent. The aprotic polar solvent may include a sulfoxide-containing solvent such as dimethylsulfoxide (DMSO) and diethylsulfoxide, a formamide-containing solvent such as N,N-dimethyl formamide (DMF) and N,N-diethylformamide, an acetamide-containing solvent such as N,N-dimethylacetamide (DMA), N,N-dimethylmethoxyacetamide, and N,N-diethylacetamide, a pyrrolidone-containing solvent such as N-methyl-2-pyrrolidone (NMP), N-acetyl-2-pyrrolidone, and N-vinyl-2-pyrrolidone, a phenol-containing solvent such as phenol, o-cresol, m-cresol, p-cresol, xylenol, halogenated phenol, and catechol, hexamethylphosphoramide, γ-butyrolactone, tetrahydrothiophene dioxide, N-methyl-δ-caprolactam, N,N,N',N'-tetramethylurea, or a mixture thereof. However, this disclosure is not limited to an aprotic polar solvent, and an aromatic hydrocarbon solvent such as xylene or toluene may be used.

According to another embodiment, provided is a polyimide-inorganic particle composite prepared from the composition.

The composite may be the one in which the inorganic particle having an amino group on its surface crosslinks the polyimide chains.

According to yet another embodiment, provided is an article including the composite according to an embodiment.

The article may be a film, a fiber, a coating material, or an adhesive, but is not limited thereto.

According to still another embodiment, provided is an optical device including the article according to an embodiment.

The optical device may be a liquid crystal device, an organic light emitting diode device, or a complementary metal-oxide semiconductor sensor, but it is not limited thereto.

Figure 13:
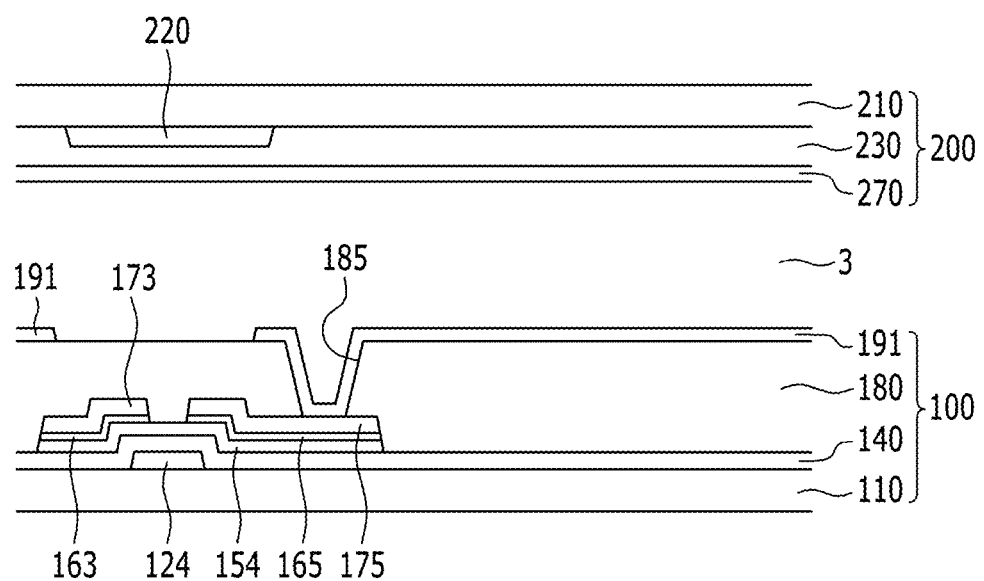
FIG. 13 is a cross-sectional view showing a liquid crystal device (LCD) according to an embodiment.

Among the display devices, a liquid crystal display (LCD) is described by referring to FIG. 13. FIG. 13 is a cross-sectional view of a liquid crystal display (LCD) in accordance with an embodiment.

Referring to FIG. 13, the liquid crystal display (LCD) includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173 and a drain electrode 175 are sequentially disposed on a substrate 110. The source electrode 173 and the drain electrode 175 are isolated from each other and face each other with the gate electrode 124 disposed between them.

One gate electrode 124, one source electrode 173, and one drain electrode 175 constitute one thin film transistor (TFT) together with the semiconductor 154, and a channel of the thin film transistor is formed in the semiconductor 154 between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as ITO or IZO is disposed on the protective layer 180. The pixel electrode 191 is connected to the drain electrode 175 through the contact hole 185.

The common electrode panel 200 will now be described in detail.

In the common electrode panel 200, a lighting member 220 referred to as a black matrix is disposed on a substrate 210, a color filter 230 is disposed on the substrate 210 and the lighting member 220, and a common electrode 270 is formed on the color filter 230.

Herein, the substrates 110 and 210 may be articles including the polyimide-inorganic particle composite.

Figure 14:
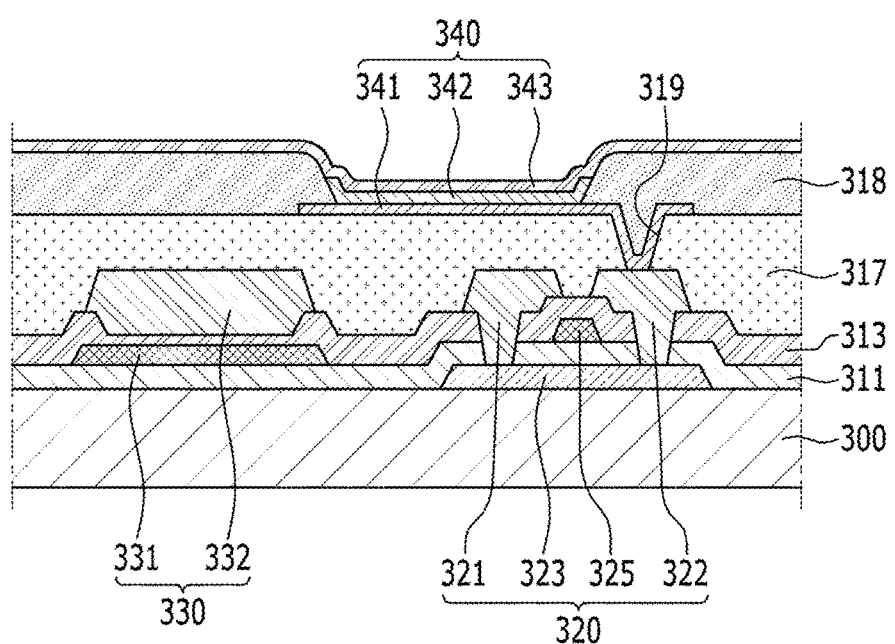
FIG. 14 is a cross-sectional view showing an organic light emitting diode (OLED) according to an embodiment.

Among the display devices, an organic light emitting diode (OLED) is described by referring to FIG. 14. FIG. 14 is a cross-sectional view of an organic light emitting diode (OLED) in accordance with an embodiment.

Referring to FIG. 14, a thin film transistor 320, a capacitor 330, and an organic light emitting element 340 are formed on a substrate 300. The thin film transistor 320 includes a source electrode 321, a semiconductor layer 323, a gate electrode 325, and a drain electrode 322, and the capacitor 330 includes a first capacitor 331 and a second capacitor 332. The organic light emitting element 340 includes a pixel electrode 341, an intermediate layer 342, and an opposed electrode 343.

According to an embodiment, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300. The source electrode 321 and the drain electrode 322 are isolated from each other, and face each other with the gate electrode 325 disposed between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341 formed of a transparent conductive material such as ITO or IZO is disposed on the planarization layer 317. The pixel electrode 341 is connected to the drain electrode 322 through the contact hole 319.

The intermediate layer 342 and the opposed electrode 343 are sequentially disposed on the pixel electrode 341.

A pixel defining layer 318 is formed in a portion where the pixel electrode 341, the intermediate layer 342, and the opposed electrode 343 are not formed on the planarization layer 317.

Herein, the substrate 300 may be an article including the polyimide-inorganic particle composite.

Hereafter, the embodiments are described in detail with reference to examples. The following examples and comparative examples are not restrictive, but are illustrative.

EXAMPLES

Example 1: Synthesis of polyamic acid-$Al_2O_3$ Composite Solution 96 milliliters (ml) of N-methylpyrrolidone (NMP) as a solvent is added to a 250 milliliter four-neck double walled reactor equipped with a mechanical stirrer and an inlet for $N_2$, under $N_2$ gas atmosphere at 25° C., and 0.0365 moles (11.69 grams (g)) of 2,2'-bis(trifluoromethyl)benzidine (TFDB)) is added thereto. Then, 0.13 percent by weight (wt %), 0.36 wt %, 0.71 wt %, 1.50 wt %, 2.0 wt %, and 3.0 wt % of spherical $Al_2O_3$, having a particle size of about 15 nanometers, based on the weight of the solid content of the polyamic acid to be prepared, are respectively added to the reactors. The surface of $Al_2O_3$ is pretreated with 3-aminophenyl trimethoxysilane in an amount of 4 wt % based on the weight of $Al_2O_3$. Then, the tetracarboxylic acid dianhydrides of 0.0256 mole (7.52 grams) of BPDA (3,3',4,4'-biphenyltetracarboxylic dianhydride) and 0.011 mole (2.39 grams) of PMDA (pyromellitic dianhydride) are added at once, and agitated at a speed of 120 revolutions per minute (rpm) for 48 hours at room temperature to form a polyamic acid-inorganic particle composite solution.

For comparison, a polyamic acid solution that does not contain the $Al_2O_3$ pretreated with 3-aminophenyl trimethoxysilane is also prepared.

Example 2: Synthesis of polyamic acid-$Al_2O_3$ Composite Solution

Polyamic acid-inorganic particle composite solutions are prepared by the same method as in Example 1, except that 3.0 mole percent (mol %) of Bis-APAF (2,2'-bis(3-amino-4-hydroxyphenyl)-hexafluoropropane), based on the total mole number of the diamine, is combined with TFDB as the diamine.

For comparison, a polyamic acid solution that does not contain the $Al_2O_3$ surface-pretreated with 3-aminophenyl trimethoxysilane is also prepared.

Example 3: Synthesis of Polyamic Acid-$Al_2O_3$ Composite Solution

Polyamic acid-inorganic particle composite solutions are prepared by the same method as in Example 1, except that the mixture of BPDA and 6FDA (2,2-bis(3,4-dicarboxyphenyl)hexafluoropropane dianhydride) in a mole ratio of 8:2 is used instead of the mixture of BPDA and PMDA as the tetracarboxylic acid dianhydride.

For comparison, a polyamic acid solution that does not contain the $Al_2O_3$ surface-pretreated with 3-aminophenyl trimethoxysilane is also prepared.

Example 4: Synthesis of Polyamic Acid-Graphene Oxide Composite Solution

Polyamic acid-inorganic particle composite solutions are prepared by the same method as in Example 1, except that 0.06 percent by volume (vol %), 0.13 vol %, 0.25 vol %, 0.5 vol %, 1.0 vol %, 2.0 vol %, and 3.0 vol % of graphene oxide, having a thickness of about 1 nanometers (nm), and a length of about 50 nm to about 200 nm, based on the solid content of polyamic acid to be prepared, are respectively added to the reactors, instead of the $Al_2O_3$. The surface of the graphene oxide is pretreated with 3-aminophenyl trimethoxysilane in an amount of 4 wt % based on the weight of the graphene oxide.

Example 5: Synthesis of Polyamic Acid-ZnO Composite Solution

Polyamic acid-inorganic particle composite solutions are prepared by the same method as in Example 1, except that 0.13 vol %, 0.25 vol %, 0.5 vol %, 1.0 vol %, 2.0 vol %, and 3.0 vol % of spherical ZnO, having a particle diameter of about 20 nm, based on the solid content of polyamic acid prepared, are respectively added to the reactors, instead of the $Al_2O_3$. The surface of the ZnO is pretreated with 3-aminophenyl trimethoxysilane in an amount of 2 wt % based on the weight of the ZnO.

Example 6: Synthesis of Polyamic Acid-$SiO_2$ Composite Solution

Polyamic acid-inorganic particle composite solutions are prepared by the same method as in Example 1, except that the mixture of BPDA and α-BPDA (2,3,3',4'-biphenyltetracarboxylic dianhydride) in a mole ratio of 7.5:2.5 is used as the tetracarboxylic acid dianhydride, instead of the mixture of BPDA and PMDA, and 0.13 vol %, and 0.25 vol % of spherical $SiO_2$, having a particle diameter of about 10 nanometers, based on the solid content of polyamic acid to be prepared, are respectively added to the reactors, instead of the $Al_2O_3$. The surface of the $SiO_2$ is pretreated with 3-aminophenyl trimethoxysilane in an amount of 4 wt % based on the weight of $SiO_2$.

Example 7: Synthesis of Polyamic Acid-$Al_2O_3$ Composite Solution

Polyamic acid-inorganic particle composite solutions are prepared by the same method as in Example 1, except that the mixture of BPDA and α-BPDA (2,3,3',4'-biphenyltetracarboxylic dianhydride) in a mole ratio of 7.5:2.5 is used as the tetracarboxylic acid dianhydride, instead of the mixture of BPDA and PMDA, and 0.13 vol %, and 0.25 vol % of spherical $Al_2O_3$, having a particle diameter of about 15 nanometers, based on the solid content of polyamic acid to be prepared are respectively added to the reactors. The surface of the $Al_2O_3$ is pretreated with 3-aminophenyl trimethoxysilane in an amount of 4 wt % based on the weight of $Al_2O_3$.

Example 8: Synthesis of Polyamic Acid-ITO Composite Solution

Polyamic acid-inorganic particle composite solutions are prepared by the same method as in Example 1, except that the mixture of BPDA and α-BPDA (2,3,3',4'-biphenyltetracarboxylic dianhydride) in a mole ratio of 7.5:2.5 is used as the tetracarboxylic acid dianhydride, instead of the mixture of BPDA and PMDA, and 0.13 vol %, and 0.25 vol % of spherical ITO (Indium Tin Oxide) having a particle diameter of about 50 nanometers, instead of the $Al_2O_3$, based on the solid content of polyamic acid to be prepared are respectively added to the reactors. The surface of the ITO is pretreated with 3-aminophenyl trimethoxysilane in an amount of 4 wt % based on the weight of ITO.

Preparation Example: Fabricating Polyimide Film

Polyamic acid-inorganic particle composite solutions according to Examples 1 to 8 are respectively spin coated on a glass substrate, and dried on a hot plate set at 80° C. for 30 minutes. Then, the films are placed in a furnace, and are heat treated from room temperature to 300° C. at a heating rate of 3° C./minute to obtain polyimide films.

Further, in order to evaluate the films, the films are subjected to further heat treatment from room temperature to 400° C. at a heating rate of 10° C./minute, and then maintained at 400° C. for 30 minutes, 60 minutes, or 120 minutes, to obtain required films.

Experimental Example: Evaluation of Optical Properties of Film (1) Transmittance for Light of the Films According to Examples 1 to 3 in Accordance with the Condition of Heat Treatment Transmittances for light of the films according to Examples 1 to 3 having a thickness of about 10 μm, prepared by heat treatment to 300° C., as described above, are shown in FIG. 6.

Figure 7:
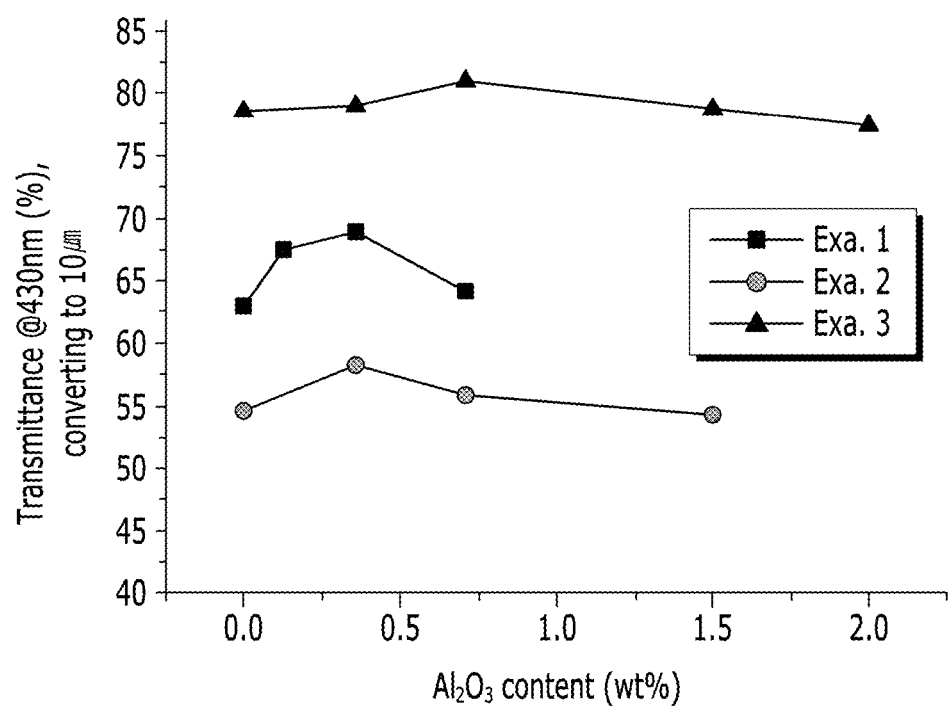
FIG. 7 shows graphs of transmittance at 430 nanometers (percent, %) versus content of $Al_2O_3$ (percent by weight, wt %) of the films having a thickness of 10 micrometers (μm) prepared from the solutions for preparing a poly(amic acid)-inorganic particle composites according to Examples 1 to 3, in which the transmittance is measured after treating the films at 400° C. for 0.5 hour.
Figure 8:
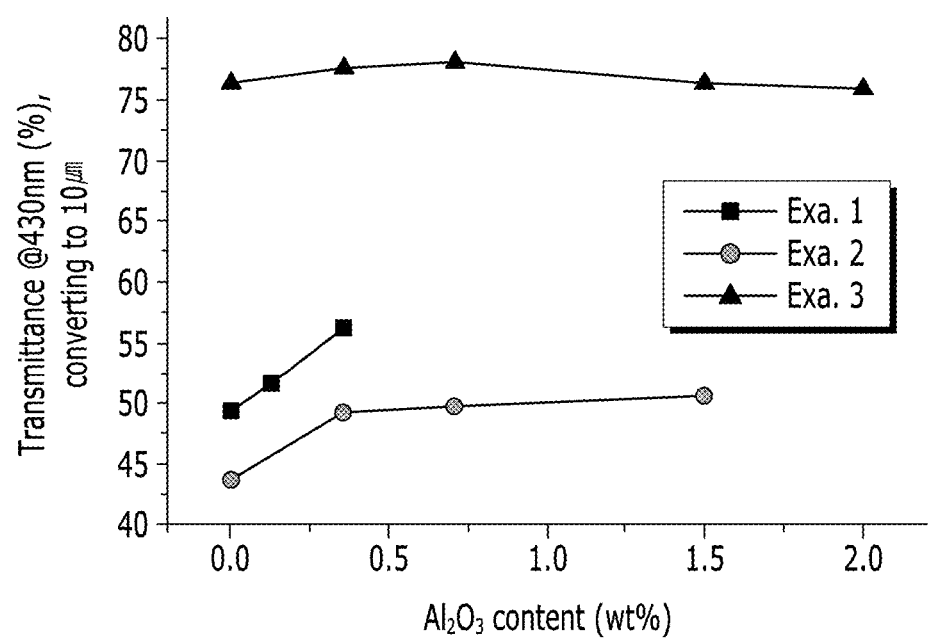
FIG. 8 shows graphs of transmittance at 430 nanometers versus content of $Al_2O_3$ (percent by weight, wt %) of the films having a thickness of 10 micrometers (μm) prepared from the solutions for preparing a poly(amic acid)-inorganic particle composites according to Examples 1 to 3, in which the transmittance is measured after treating the films at 400° C. for 2 hours.

Further, transmittances for light of the films according to Examples 1 to 3 prepared after being further maintained at 400° C. for 30 minutes are measured at 430 nanometers and are shown in FIG. 7. Again, transmittances for light of the films according to Examples 1 to 3 prepared after being further maintained at 400° C. for 1 hour are measured at 430 nanometers and are shown in FIG. 8.

The transmittance for light and yellowness index (YI) of the films according to Example 1 in accordance with the condition of heat treatment and the content of $Al_2O_3$ are shown in Table 1 below. The transmittance for light and yellowness index (YI) of the films according to Example 2 in accordance with the condition of heat treatment and the content of $Al_2O_3$ are shown in Table 2 below. The transmittance for light and yellowness index (YI) of the films according to Example 3 in accordance with the condition of heat treatment and the content of $Al_2O_3$ are shown in Table 3 below.

The transmittance for light of the films is measured by using "8452A Spectrophotometer" produced by Hewlett Packard at a wavelength ranging from 380 nanometers to 780 nanometers. The yellowness index (YI) of the films is measured by using a UV spectrophotometer (Konica Minolta Co., Ltd., cm-3600d) according to ASTM E313. Meanwhile, UV absorbance is calculated by subtracting transmittance for light from 100 (i.e., A (UV absorbance)=100−T (transmittance for light)).

TABLE 1

| $Al_2O_3$ | 300° C./1 h | | 400° C./0.5 h | | 400° C./1 h | |
|---|---|---|---|---|---|---|
| (wt %) | Trans.@430 nm | YI | Trans.@430 nm | YI | Trans.@430 nm | YI |
| 0 | 79.9% | 5.5 | 62.95 | 17.2 | 49.3% | 27.0 |
| 0.13 | 78.5% | 6.3 | 67.4% | 19.7 | 51.5% | 21.1 |
| 0.36 | 79.5% | 5.4 | 68.8% | 12.5 | 56.1% | 21.4 |
| 0.71 | 79.5% | 5.3 | 64.1% | 15.1 | | |

TABLE 2

| $Al_2O_3$ | 300° C./1 h | | 400° C./0.5 h | | 400° C./1 h | |
|---|---|---|---|---|---|---|
| (wt %) | Trans.@430 nm | YI | Trans.@430 nm | YI | Trans.@430 nm | YI |
| 0 | 79.1% | 5.7 | 54.5% | 22.5 | 43.6% | 27.0 |
| 0.36 | 79.8% | 5.7 | 58.2% | 21.0 | 49.1% | 21.1 |
| 0.71 | 80.1% | 5.4 | 55.8% | 23.2 | 49.6% | 21.4 |
| 1.50 | 78.3% | 6.5 | 54.3% | 23.2 | 50.6% | 26.1 |

TABLE 3

| $Al_2O_3$ | 300° C./1 h | | 400° C./0.5 h | | 400° C./1 h | |
|---|---|---|---|---|---|---|
| (wt %) | Trans.@430 nm | YI | Trans.@430 nm | YI | Trans.@430 nm | YI |
| 0 | 85.3% | 2.69 | 78.6% | 7.14 | 76.4% | 8.74 |
| 0.36 | 84.5% | 3.12 | 79.0% | 6.83 | 77.6% | 7.58 |
| 0.71 | 84.7% | 2.8 | 80.9% | 5.44 | 78.1% | 7.32 |
| 1.50 | 84.7% | 2.77 | 78.7% | 6.73 | 76.3% | 8.28 |
| 2.00 | 84.4% | 3.00 | 77.3% | 7.61 | 75.9% | 8.31 |

Figure 6:
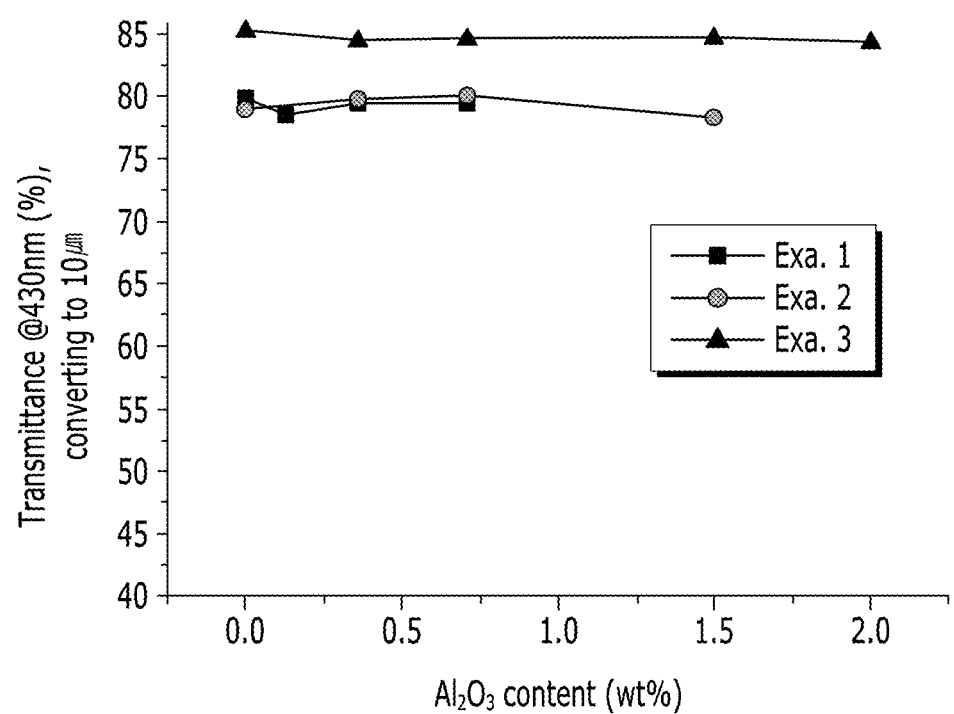
FIG. 6 shows graphs of transmittance at 430 nanometers (percent, %) versus content of $Al_2O_3$ (percent by weight, wt %) of the films having a thickness of 10 micrometers (μm) prepared from the solutions for preparing a poly(amic acid)-inorganic particle composites according to Examples 1 to 3, in which the transmittance is measured after treating the films at 300° C. for 1 hour.

As shown from FIGS. 6 to 8 and Tables 1 to 3, there is no specific difference in the transmittance values for light between the films including $Al_2O_3$ treated with amino group and the films that does not include $Al_2O_3$, when the films are maintained at 300° C. for 1 hour. However, if the films are further maintained at 400° C. for 0.5 hour, transmittance values for light of the films including $Al_2O_3$ treated with amino group are better than transmittance values of the films that do not include $Al_2O_3$. Further, if the films are further maintained at 400° C. for another 1 hour, transmittance values for light of the films including $Al_2O_3$ treated with amino group are significantly better than transmittance values of the films that do not include $Al_2O_3$. That is, improvement of transmittance for light is more effective at a temperature equal to or greater than the glass transition temperature of the polymer, especially, when heat treatment is conducted at a high temperature for a long time.

(2) Transmittance for Light in Accordance with Inorganic Particle

Transmittance values for light of the films according to Examples 1, 4, and 5 having a thickness of about 10 μm, after being maintained at 400° C. for 0.5 hour as described above, are shown in FIG. 9.

Figure 9:
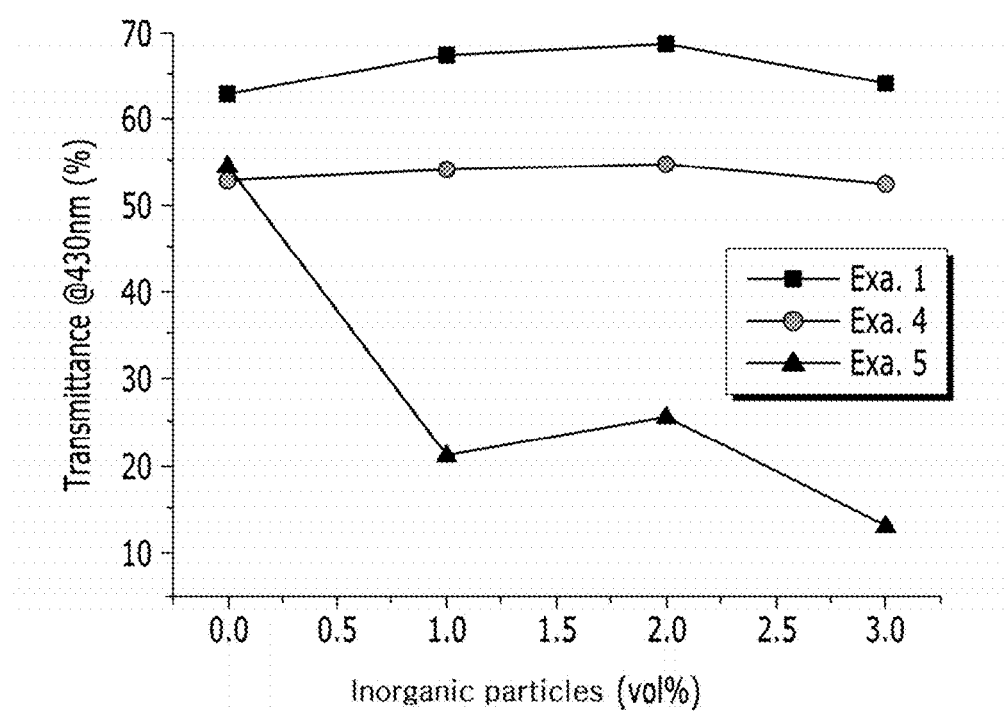
FIG. 9 shows graphs of transmittance at 430 nanometers versus content of inorganic particles of the films having a thickness of 10 micrometers (μm) prepared from the solutions for preparing a poly(amic acid)-inorganic particle composites according to Examples 1, 4, and 5, in which the transmittance is measured after treating the films at 400° C. for 0.5 hour.

As shown from FIG. 9, transmittance values for light of the films, in which the polyimides are the same as in Example 1, while the inorganic particles are different, are different from those of Example 1, depending on the inorganic particle. When the inorganic particles are included in the same amount, the transmittance for light of the film including $Al_2O_3$ is the highest, and the transmittance for light of the film including ZnO is the lowest.

(3) Transmittance for Light in Accordance with Inorganic Particle

Transmittance values for light at 430 nanometers versus $n_p/n_m-1$ (wherein, $n_p$ is refractive index of inorganic particle and $n_m$ is refractive index of matrix) of the films according to Examples 6 to 8, including 0.13 vol % or 0.25 vol % of the inorganic particles, after being maintained at 400° C. for 2 hour as described above, are shown in FIG. 10.

Figure 10:
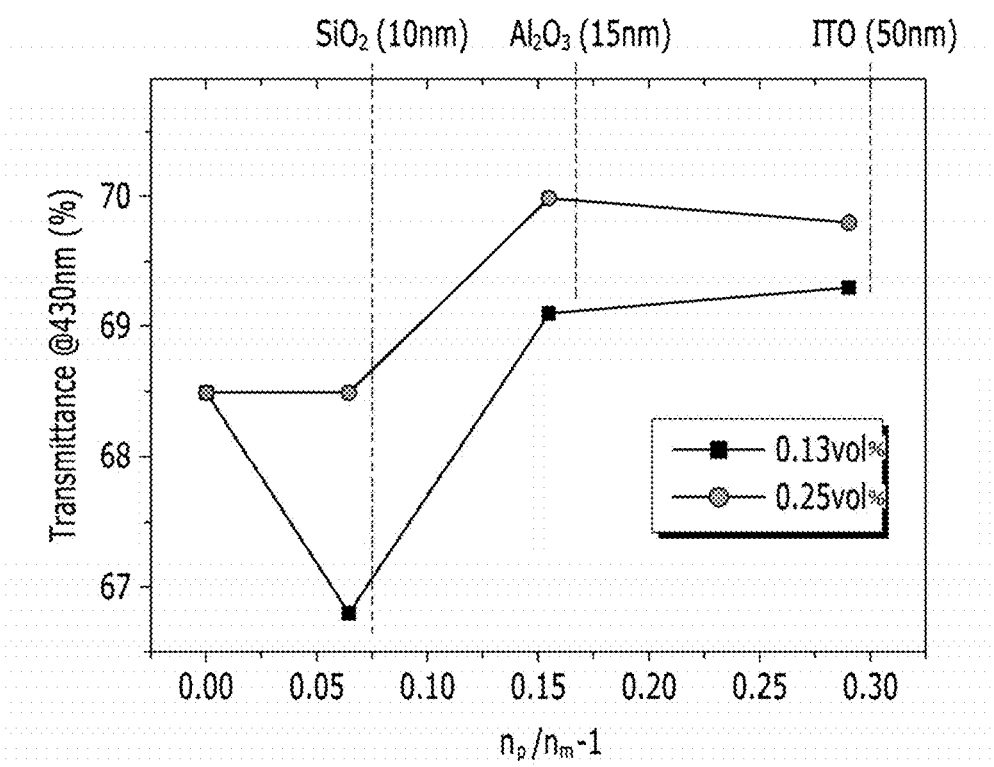
FIG. 10 shows graphs of transmittance for light at 430 nanometers versus the ratio of refractive index of inorganic particles to refractive index of matrix $n_p/n_m-1$, wherein, $n_p$ is refractive index of inorganic particles, and $n_m$ is refractive index of matrix of the films including 0.13 percent by volume (vol %) or 0.25 percent by volume (vol %) of the inorganic particles and having a thickness of 10 micrometers (μm), prepared from the solutions for preparing a poly(amic acid)-inorganic particle composites according to Examples 6 to 8.

As shown from FIG. 10, the larger the difference of the refractive index of the inorganic particles compared to the refractive index of the matrix, the higher the improvement of the transmittance for light of the composite film that includes the inorganic particle. Particularly, when the inorganic particle is ITO, although the particle size of 50 nanometers is used, it is expected that the transmittance for light would be more improved, if the size of the inorganic particle is smaller.

Figure 11:
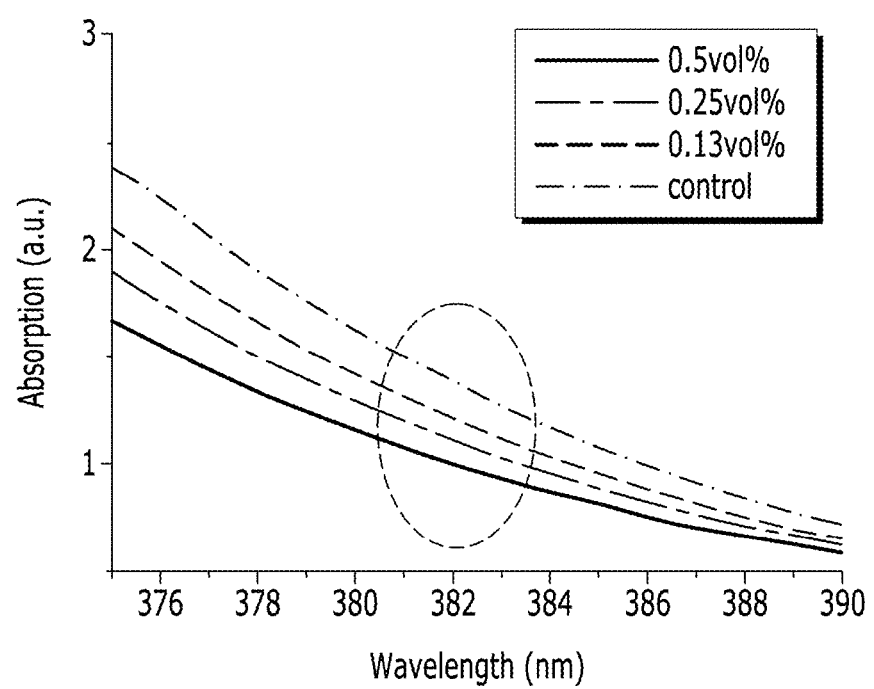
FIG. 11 is a graph of absorbance (arbitrary unit, a. u.) versus wavelength (nanometers, nm) showing UV absorbances of the composite films according to Example 4, including different amount of plate-like graphene oxide, in which the films are treated at 300° C. for 1 hour.
Figure 12:
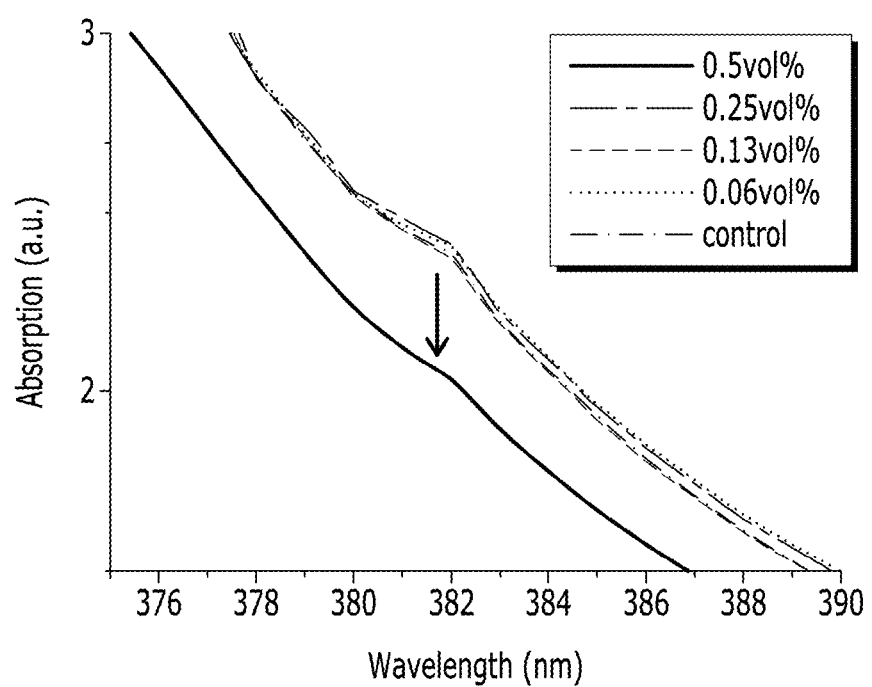
FIG. 12 is a graph of absorbance (arbitrary unit, a. u.) versus wavelength (nanometers, nm) showing UV absorbances of the composite films according to Example 4, including different amount of plate-like graphene oxide, in which the films are treated at 400° C. for 2 hours.

(4) Improvement of Transmittance for Light Due to Introduction of Inorganic Particles Transmittance values for light of the composite films according to Example 4 including plate-like graphene oxide in an amount of 0.06 vol %, 0.13 vol %, 0.25 vol %, and 0.5 vol %, respectively, after being maintained at 300° C. for 1 hour (FIG. 11) and after being maintained at 400° C. for 2 hour (FIG. 12), respectively, are shown in FIGS. 11 and 12, by measuring UV absorbances of the films.

As shown from FIG. 11, no specific peak indicating high absorbance at UV region is found, when the film is maintained at a temperature equal to or lower than the glass transition temperature. However, as shown in FIG. 12, when the film is maintained at a temperature equal to or greater than 400° C., a specific absorbance peak at approximately 382 nanometers is found, which seems to derive from the charge transfer complex (CTC) of polyimide. However, when plate-like graphene oxide is introduced, the peak reduces, and the transmittance for light approaching 400 nanometers improves from about 39% to about 44%.

The graphs indicated as "control" in FIGS. 11 and 12 correspond to the polyamic acid film prepared in Example 1 for comparison, prepared from TFDB, BPDA, and PMDA.

As described above, if a polyimide-inorganic particle composite is prepared by introducing inorganic particle having an amino group on its surface into the composition for preparing polyimide to participate in the in-situ polymerization reaction with the monomers of the polyimide, transmittance for light of the film prepared from the composition may be improved by inhibiting formation of CTC by impeding formation of polymer chain packing. Further, the inorganic particles may be grafted on the polymer chains through the in-situ polymerization reaction to be evenly distributed throughout the matrix, which may result in enhancing mechanical strength and reducing CTE (coefficient of thermal expansion) of the composite film.

While this disclosure has been described in connection with what is presently considered to be practical exemplary embodiments, it is to be understood that the present inventive concept is not limited to the disclosed embodiments, but, on the contrary, is intended to cover various modifications and equivalent arrangements which are included within the spirit and scope of the appended claims.

What is claimed is:

1. A film comprising polyimide-inorganic particle composite prepared by a reaction among:
   a tetracarboxylic acid dianhydride represented by Chemical Formula 1,
   a diamine represented by Chemical Formula 2, and
   an inorganic particle comprising an amino group on its surface:

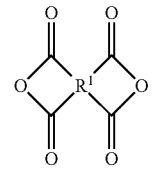

Chemical Formula 1

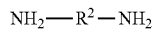

Chemical Formula 2 wherein in Chemical Formula 1 and Chemical Formula 2, $R^1$ and $R^2$ are the same or different, and are each independently a C4 to C30 alicyclic organic group, or a substituted or unsubstituted C6 to C30 aromatic organic group, wherein the alicyclic or aromatic organic group comprises alicyclic or aromatic one ring, two or more alicyclic or aromatic rings fused together to provide a condensed ring system, or two or more rings linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(C$_n$H$_{2n+1}$)$_2$—, —C(C$_n$F$_{2n+1}$)$_2$—, wherein 1≤n≤10, —C(=O)NH—, a C3 to C10 cycloalkylene group, a C2 to C10 heterocycloalkylene group, a C6 to C15 arylene group, and a C3 to C15 heteroarylene group, wherein the substituted C6 to C30 aromatic organic group is substituted with at least one substituent selected from halogen, a hydroxyl group, nitro group, cyano group, an amino group (—NH$_2$, —NH(R$^{100}$) or —N(R$^{101}$)

($R^{102}$), wherein $R^{100}$, $R^{101}$, and $R^{102}$ are the same or different, and are each independently a C1 to C10 alkyl group, an amidino group, a hydrazine group, a hydrazone group, a carboxyl group, or a substituted or unsubstituted alkyl group, where the substitution is substituted with at least one halogen, wherein the inorganic particle is an oxide of at least one element selected from Ti, Al, Zr, Sn, B, Ce, Sr, Ca, Ba, In, and W, or a graphene oxide, wherein the inorganic particle has an average size of from about 0.1 nanometers to about 200 nanometers, wherein the amino group on the surface of the inorganic particle is reacted with the tetracarboxylic acid dianhydride represented by Chemical Formula 1 to form an imide, and wherein an amount of the inorganic particle is less than or equal to about 2 percent by volume based on the total volume of a solid content of the polyimide.

2. The film according to claim 1, wherein the tetracarboxylic acid dianhydride represented by Chemical Formula 1 comprises a tetracarboxylic acid dianhydride represented by Chemical Formula 1-1:

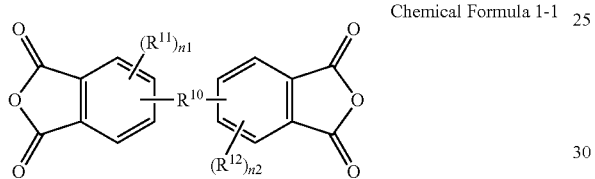

Chemical Formula 1-1 wherein in Chemical Formula 1-1,
$R^{10}$ is single bond, a fluorenylene group, —O—, —S—, —C(=O)—, —CH(OH)—, —S(=O)$_2$—, —Si(CH$_3$)$_2$—, —(CH$_2$)$_p$— wherein 1≤p≤10, —(CF$_2$)$_q$— wherein 1≤q≤10, —C(C$_n$H$_{2n+1}$)$_2$—, —C(C$_n$F$_{2n+1}$)$_2$—, wherein 1≤n≤10, —C(=O)NH—, a C3 to C10 cycloalkylene group, a C2 to C10 heterocycloalkylene group, a C6 to C15 arylene group, or a C3 to C15 heteroarylene group, $R^{11}$ and $R^{12}$ are the same or different and are independently a halogen, hydroxyl group, a C1 to C10 aliphatic organic group, a C6 to C20 aromatic organic group, a group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are the same or different and are independently hydrogen or a C1 to C10 aliphatic organic group, n1 and n2 are the same or different and are independently an integer ranging from 0 to 3.

3. The film according to claim 2, wherein the tetracarboxylic acid dianhydride represented by Chemical Formula 1-1 is a combination of a tetracarboxylic dianhydride represented by Chemical Formula 1-2 and a tetracarboxylic dianhydride represented by Chemical Formula 1-3:

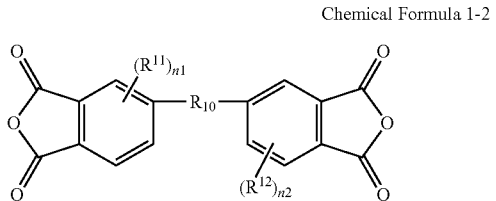

Chemical Formula 1-2

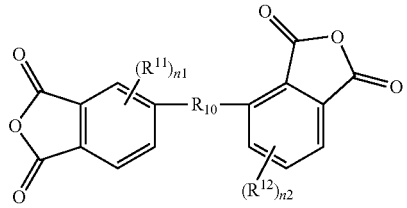

Chemical Formula 1-3 wherein in Chemical Formulae 1-2 and 1-3,
$R^{10}$, $R^{11}$, $R^{12}$, n1, n2 are the same as defined in claim 2.

4. The film according to claim 2, wherein the tetracarboxylic acid dianhydride represented by Chemical Formula 1 further comprises a tetracarboxylic acid dianhydride represented by Chemical Formula 1-4:

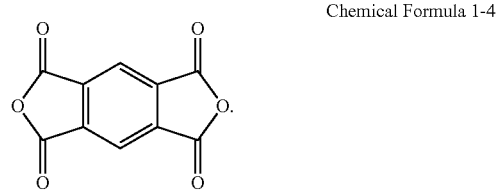 [SMILES: O=c1oc(=O)c2cc3c(=O)oc(=O)c3cc12]

Chemical Formula 1-4

5. The film according to claim 2, wherein the tetracarboxylic acid dianhydride represented by Chemical Formula 1-1 is a combination of a tetracarboxylic dianhydride represented by Chemical Formula 1-5 and a tetracarboxylic dianhydride represented by Chemical Formula 1-6:

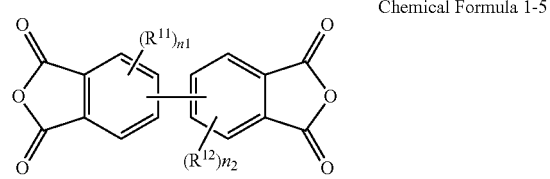

Chemical Formula 1-5

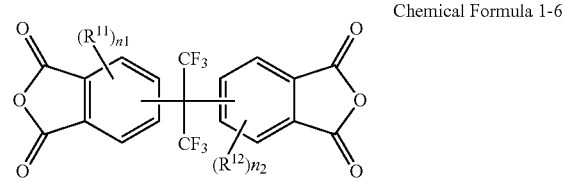

Chemical Formula 1-6 wherein in Chemical Formulae 1-5 and 1-6,
$R^{11}$, $R^{12}$, n1, n2 are the same as defined in claim 2.

6. The film according to claim 1, wherein the inorganic particle comprises two or more amino groups on its surface.

7. The film according to claim 1,
wherein a compound comprising an amino group end is attached to a surface of the inorganic particle.

8. The film according to claim 1, wherein the inorganic particle is selected from Al$_2$O$_3$, TiO$_2$, ZrO$_2$, Indium Tin Oxide, SrCO$_3$, ZrW$_2$O$_8$, antimony doped tin oxide, and graphene oxide.

9. The film according to claim 7, wherein the compound comprising an amino group end is represented by Chemical Formula 3:

Chemical Formula 3

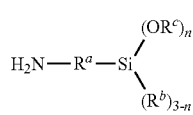

wherein in Chemical Formula 3, $R^a$ is a C1 to C20 alkylene, a C2 to C20 alkenylene, a C2 to C20 alkynylene, a C3 to C20 cycloalkylene, a C3 to C20 cycloalkenylene, a C3 to C20 cycloalkynylene, a C6 to C18 arylene, or a C6 to C19 aralkylene, $R^b$ is hydrogen, a substituted or unsubstituted C1 to C20 alkyl, a substituted or unsubstituted C2 to C20 alkenyl, a substituted or unsubstituted C2 to C20 alkynyl, a substituted or unsubstituted C3 to C20 cycloalkyl, or a substituted or unsubstituted C6 to C18 aryl, wherein the substituent is selected from an acryloxy group, a glycidoxy group, or an isocyanato group, $R^c$ is hydrogen, a C1 to C20 alkyl, a C2 to C20 alkenyl, a C2 to C20 alkynyl, a C3 to C20 cycloalkyl, or a C6 to C18 aryl, and n is an integer ranging from 1 to 3.

10. The film according to claim 9, wherein the compound represented by Chemical Formula 3 is selected from 3-aminopropyl trimethoxysilane 3-aminopropyl triethoxysilane, or 3-aminophenyl trimethoxysilane.

11. The film according to claim 1, wherein the tetracarboxylic acid dianhydride represented by Chemical Formula 1 is one or more selected from 2,3,3',4'-biphenyltetracarboxylic dianhydride, 2,3,3',4'-diphenylsulfone tetracarboxylic dianhydride, 3,4'-oxydiphthalic anhydride, 3,3',4,4'-biphenyl tetracarboxylic dianhydride, bicyclo[2.2.2]oct-7-ene-2,3,5,6-tetracarboxylic dianhydride, 3,3',4,4'-diphenylsulfone tetracarboxylic dianhydride, 4,4'-(hexafluoroisopropylidene)diphthalic anhydride, 4,4'-oxydiphthalic anhydride, pyromellitic dianhydride, and 4-(2,5-dioxotetrahydrofuran-3-yl)-1,2,3,4-tetrahydronaphthalene-1,2-dicarboxylic anhydride.

12. The film according to claim 1, wherein the diamine represented by Chemical Formula 2 is one or more selected from the following chemical formulae:

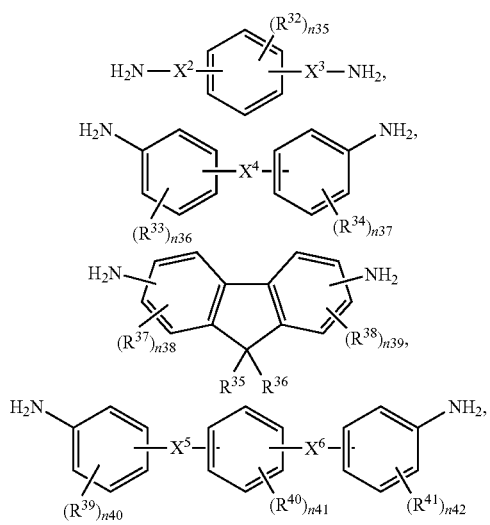

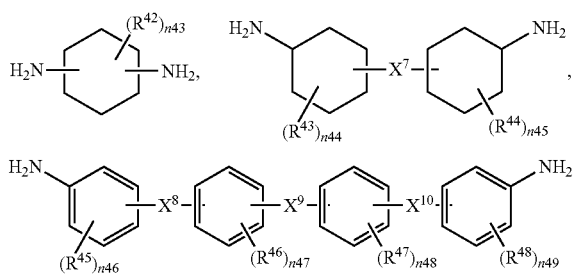

wherein in the chemical formulae, $R^{32}$ to $R^{52}$ are the same or different and are each independently a halogen, a nitro group, a C1 to C15 alkyl group, a C1 to C15 alkoxy group, a C1 to C15 fluoroalkyl group, a C3 to C15 cycloalkyl group, a C3 to C15 heterocycloalkyl group, a C3 to C15 cycloalkoxy group, a C6 to C15 aryl group, a C6 to C15 aryloxy group, or a C3 to C15 heteroaryl group, $X^2$ to $X^{12}$ are the same or different and are each independently single bond, a C1 to C10 alkylene group, a C3 to C10 cycloalkylene group, a C2 to C10 heterocycloalkylene group, a C6 to C15 arylene group, a C3 to C15 heteroarylene group, $-SO_2-$, $-O-$, $-C(=O)-$, a group selected from chemical formulae:

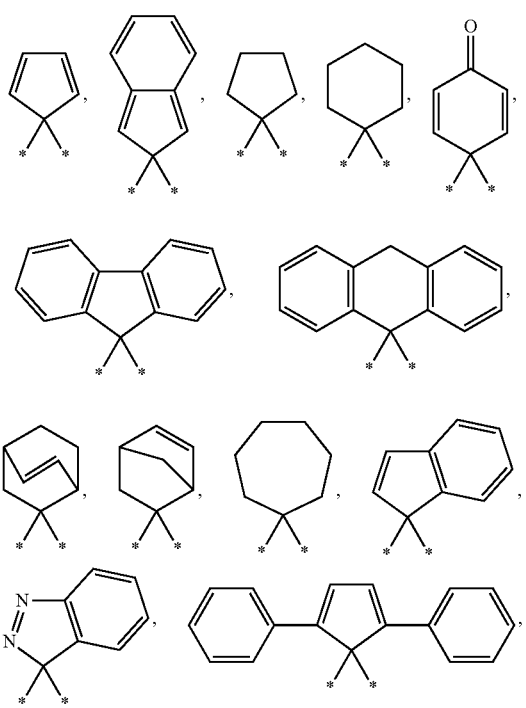

or a combination thereof, n35 to n37, and n40 to n49, are integers ranging from 0 to 4, and n38 and n39 are integers ranging from 0 to 3.

13. The film according to claim 1, wherein the diamine is selected from compounds represented by the following chemical formulae, and a combination thereof:

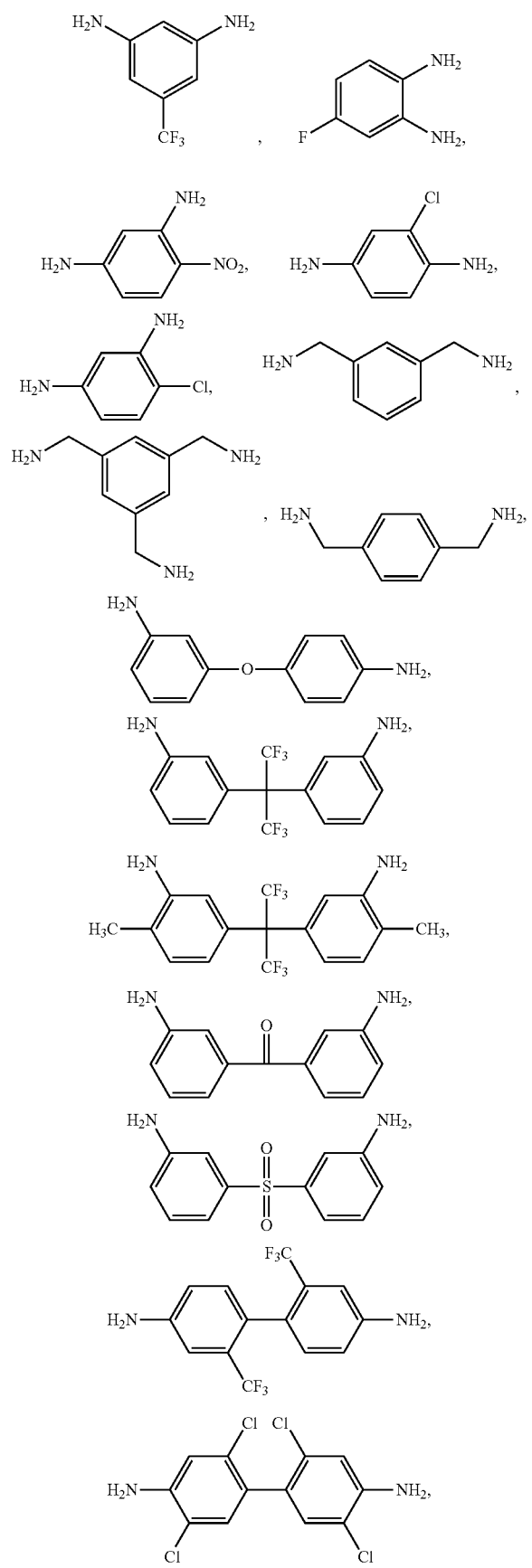
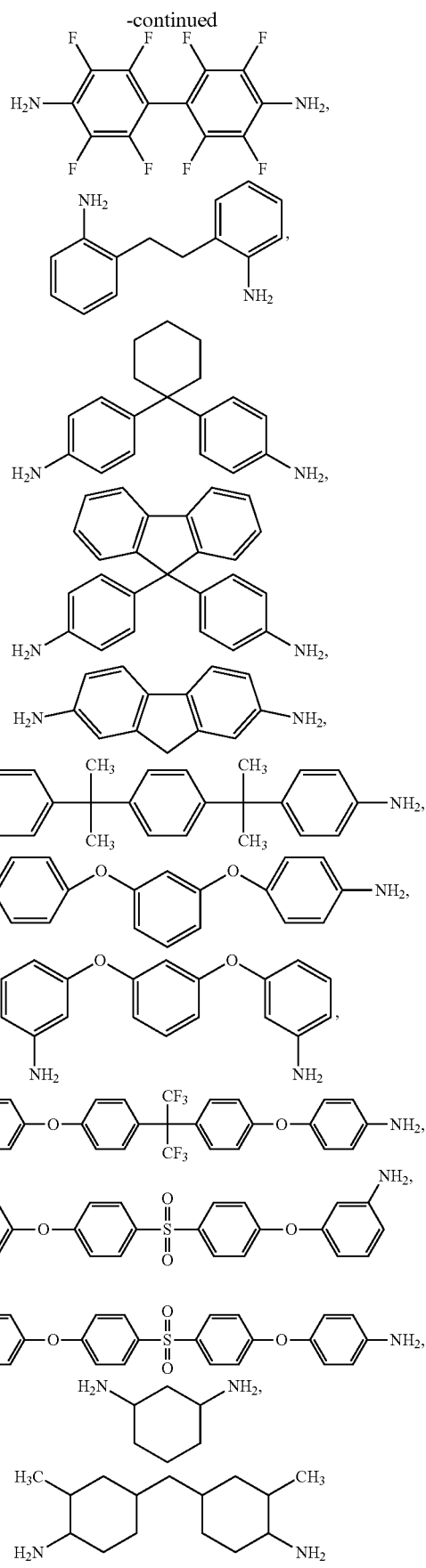

-continued

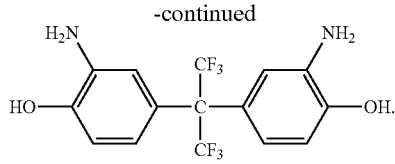

14. The film according to claim 1, wherein the inorganic particle crosslinks polyimide chains.

15. An optical device comprising the film according to claim 1.

16. The optical device according to claim 15, wherein the optical device is a liquid crystal device, an organic light emitting diode device, or a complementary metal-oxide semiconductor sensor.

17. The film according to claim 1, wherein an amount of the inorganic particle is from about 0.05 percent by volume to about 1 percent by volume based on the total volume of a solid content of the polyimide.

18. The film according to claim 1, wherein an amount of the inorganic particle is from about 0.1 percent by volume to about 0.8 percent by volume based on the total volume of a solid content of the polyimide.

19. The film according to claim 1, wherein an amount of the inorganic particle is from about 0.15 percent by volume to about 0.75 percent by volume based on the total volume of a solid content of the polyimide.

* * * * *